US012800290B2

(12) United States Patent
Chindo

(10) Patent No.: US 12,800,290 B2
(45) Date of Patent: Nov. 17, 2026

(54) MIRROR MOVEMENT MECHANISM AND INTERFEROMETER

(71) Applicant: SEIKO EPSON CORPORATION, Tokyo (JP)

(72) Inventor: Koji Chindo, Chino (JP)

(73) Assignee: SEIKO EPSON CORPORATION (JP)

(*) Notice: Subject to any disclaimer, the term of this patent is extended or adjusted under 35 U.S.C. 154(b) by 140 days.

(21) Appl. No.: 18/983,779

(22) Filed: Dec. 17, 2024

(65) Prior Publication Data

US 2025/0198922 A1 Jun. 19, 2025

(30) Foreign Application Priority Data

Dec. 18, 2023 (JP) ................................ 2023-212933

(51) Int. Cl.

| | |
|---|---|
| ***G01B 11/02*** | (2006.01) |
| ***G01J 3/06*** | (2006.01) |
| ***G01J 3/453*** | (2006.01) |
| ***G01N 21/35*** | (2014.01) |
| ***G02B 7/198*** | (2021.01) |

(52) U.S. Cl.

CPC ................ *G01B 11/02* (2013.01); *G01J 3/06* (2013.01); *G01J 3/453* (2013.01); *G01J 3/4535* (2013.01); *G02B 7/198* (2013.01); *G01N 2021/3595* (2013.01); *G01N 2201/0636* (2013.01)

(58) Field of Classification Search

CPC ....................... G01B 9/02049; G01B 9/02061; G01B 11/02; G01B 2290/35; G01J 3/0202; G01J 3/06; G01J 3/453; G02B 7/198

See application file for complete search history.

(56) References Cited

U.S. PATENT DOCUMENTS 4,179,219 A * 12/1979 Smith ..................... G01J 3/453 356/455
6,229,614 B1 * 5/2001 Larsen .................... G01J 3/453 356/451
9,297,639 B2 * 3/2016 Jackson ................ G01J 3/0237
2010/0265512 A1 10/2010 Medhat et al.

(Continued)

FOREIGN PATENT DOCUMENTS

JP H06-034439 A 2/1994
JP 2012-524295 A 10/2012

(Continued)

OTHER PUBLICATIONS

Chai, Junyu et al. "Review of MEMS Based Fourier Transform Spectrometers". Micromachines (Basel). Feb. 20, 2020;11(2):214. (Year: 2020).*

*Primary Examiner* — Michael A Lyons

(74) *Attorney, Agent, or Firm* — Harness, Dickey & Pierce, P.L.C.

(57) ABSTRACT

A mirror movement mechanism: includes: a movement mirror having a reflecting surface; an inner cylinder supporting the movement mirror on an inner surface thereof and having, on an outer surface thereof, a first screw groove extending around a central axis; an outer cylinder having, on an inner surface thereof, a second screw groove screwed into the first screw groove; and a driver configured to move the inner cylinder in a direction of the central axis by rotationally driving the inner cylinder with the central axis as a rotation axis.

17 Claims, 17 Drawing Sheets

(56) References Cited

U.S. PATENT DOCUMENTS

| | | | | |
|---|---|---|---|---|
| 2018/0149465 | A1* | 5/2018 | Lee | G01J 3/4535 |
| 2020/0124479 | A1 | 4/2020 | Suzuki et al. | |
| 2024/0004180 | A1* | 1/2024 | Xia | G02B 21/00 |
| 2024/0393180 | A1* | 11/2024 | Yamada | G01B 21/02 |

FOREIGN PATENT DOCUMENTS

| | | | | | |
|---|---|---|---|---|---|
| WO | WO-2012063551 | A1 * | 5/2012 | | G01J 3/0202 |
| WO | 2019-009404 | A1 | 1/2019 | | |

* cited by examiner

MIRROR MOVEMENT MECHANISM AND INTERFEROMETER

The present application is based on, and claims priority from JP Application Serial Number 2023-212933, filed Dec. 18, 2023, the disclosure of which is hereby incorporated by reference herein in its entirety.

BACKGROUND

1. Technical Field

The present disclosure relates to a mirror movement mechanism and an interferometer.

2. Related Art

WO 2019/009404 discloses an optical module used for spectroscopic analysis for acquiring spectral information of light emitted or absorbed by a sample and analyzing components and the like in the sample based on the information. The optical module includes a mirror unit, a beam splitter unit, a light incident unit, a first photodetector, a second light source, and a second photodetector. The mirror unit includes a movable mirror that moves in a predetermined direction and a fixed mirror whose position is fixed. In such an optical module, an interference optical system into which measurement light and laser light are incident is implemented by the beam splitter unit, the movable mirror, and the fixed mirror.

The measurement light incident from a first light source through a measurement target passes through the light incident unit and is split in the beam splitter unit. A part of the measurement light thus split is reflected by the movable mirror and then returns to the beam splitter unit. A remainder of the split measurement light is reflected off the fixed mirror and returns to the beam splitter unit. The part and the remainder of the measurement light returned to the beam splitter unit are detected as interference light by the first photodetector.

Meanwhile, the laser light output from the second light source is split by the beam splitter unit. A part of the laser light thus split is reflected by the movable mirror and then returns to the beam splitter unit. A remainder of the split laser light is reflected off the fixed mirror and returns to the beam splitter unit. The part and the remainder of the laser light returned to the beam splitter unit are detected as interference light by the second photodetector.

In such an optical module, a position of the movable mirror is measured based on a detection result of the interference light of the laser light. The spectroscopic analysis of a measurement target can then be performed based on a measurement result of the position of the movable mirror and the detection result of the interference light of the measurement light. Specifically, a waveform called an interferogram is obtained by determining an intensity of the measurement light at each position of the movable mirror. Spectral information on the measurement target can be determined by performing Fourier transform on the interferogram. The optical module described in WO 2019/009404 is therefore used for a Fourier transform infrared spectroscopic analyzer (FTIR).

JP-T-2012-524295 discloses the use of an optical microelectromechanical system (optical MEMS device) in an FTIR spectrometer. The optical MEMS device includes a moveable corner cube reflector, a fixed mirror, and a MEMS actuator. The optical MEMS device can provide a large optical path delay (optical path difference) and therefore can extend a resolution range of the FTIR spectrometer.

In the optical module described in WO 2019/009404, the movement mirror (movable mirror) is driven by an electrostatic actuator. To increase accuracy of the acquired spectral information, it is important that the light incident on the movement mirror and the light output therefrom are not displaced in directions perpendicular to a light propagation direction as the movement mirror is driven, in other words, a shift of the light is small. Therefore, there is a demand for enhancing translational performance of the movement mirror. Sufficient consideration is, however, not given to the translational performance of the movement mirror in the optical module described in WO 2019/009404, and there is room for improvement.

Meanwhile, it is important to ensure a sufficient movement amount of the movement mirror in that it enables a wavelength resolution (wavenumber resolution) of the acquired spectral information to be increased. However, in order to ensure a sufficient movement amount while enhancing the translational performance of the movement mirror, it is necessary to increase a size of a driver that moves the movement mirror.

In addition, the optical MEMS device described in JP-T-2012-524295 uses the MEMS actuator. Although the MEMS actuator can be easily miniaturized, a sufficient movement amount can not be ensured.

Therefore, it is necessary to implement a mirror movement mechanism that can prevent an increase in a size of a driver that moves a movement mirror and prevent a shift during movement, and can ensure a large movement amount.

SUMMARY

A mirror movement mechanism according to an application example of the present disclosure includes:

- a movement mirror having a reflecting surface;
- an inner cylinder supporting the movement mirror on an inner surface of the inner cylinder and having, on an outer surface of the inner cylinder, a first screw groove extending around a central axis;
- an outer cylinder having, on an inner surface thereof, a second screw groove screwed into the first screw groove; and
- a driver configured to move the inner cylinder in a direction of the central axis by rotationally driving the inner cylinder with the central axis as a rotation axis.

An interferometer according to an application example of the present disclosure includes:

- the mirror movement mechanism according to the application example of the present disclosure which reflects analysis light; and
- an analysis optical system configured to output, by performing interference of light including the analysis light reflected by the mirror movement mechanism and the analysis light passing through a sample, a first light receiving signal including information derived from the sample.

DESCRIPTION OF EMBODIMENTS

Hereinafter, a mirror movement mechanism and an interferometer according to the disclosure will be described in detail based on embodiments shown in the accompanying drawings.

1. First Embodiment

An interferometer according to a first embodiment will first be described.

Figure 1:
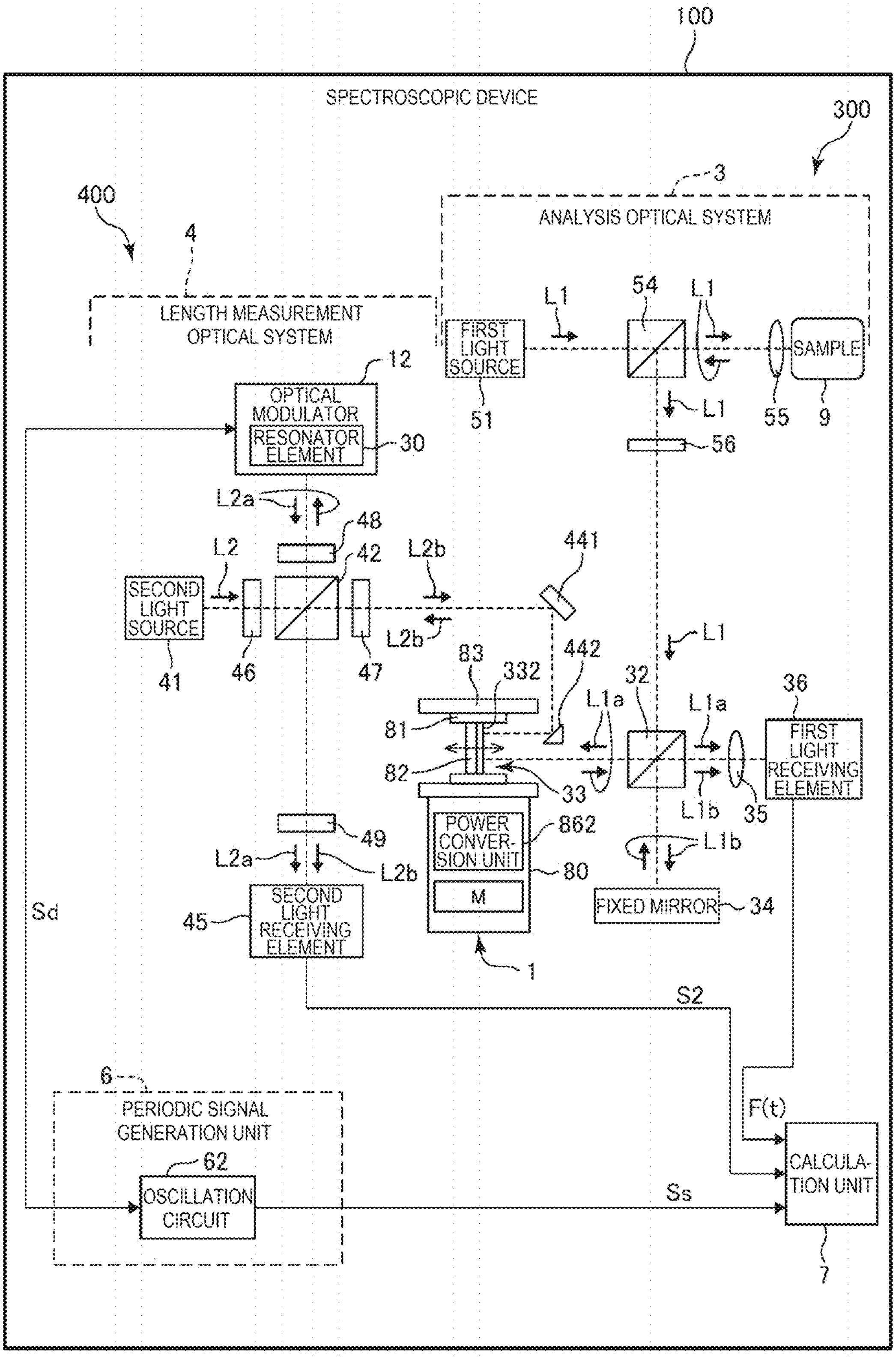
FIG. 1 is a schematic configuration diagram showing a spectroscopic device as an interferometer according to a first embodiment.
Figure 2:
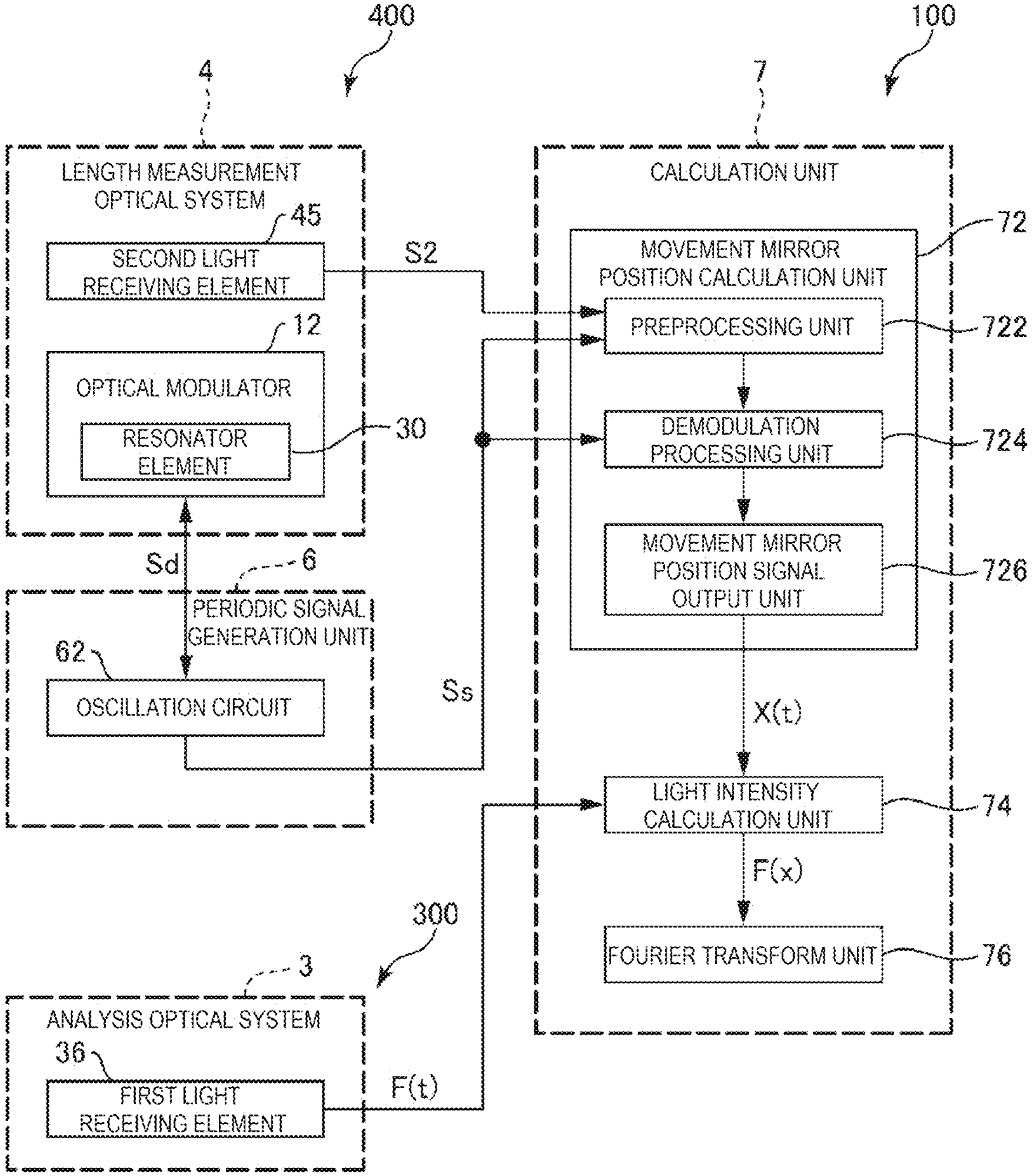
FIG. 2 is a functional block diagram showing main parts of an analysis unit, a length measurement unit, a periodic signal generation unit and a calculation unit shown in FIG. 1.

FIG. 1 is a schematic configuration diagram showing a spectroscopic device 100 as the interferometer according to the first embodiment. FIG. 2 is a functional block diagram showing main parts of an analysis unit 300, a length measurement unit 400, a periodic signal generation unit 6 and a calculation unit 7 shown in FIG. 1.

The spectroscopic device 100 shown in FIG. 1 irradiates a sample 9 as an object under test with incident analysis light L1, and the analysis light L1 emitted from the sample 9 passes through a Michelson type interference optical system. Then, the spectroscopic device 100 detects a change in intensity of the obtained interference light while moving a movement mirror to change an optical path length inside the interference optical system, and then performs calculation on a detection result to obtain an interferogram. By performing Fourier transform on the obtained interferogram, a spectral pattern (spectral information) including information derived from the sample 9 is obtained. By selecting a wavelength of the analysis light L1, the spectroscopic device 100 shown in FIG. 1 can be applied to, for example, Fourier transform infrared spectroscopy (FT-IR), Fourier transform near-infrared spectroscopy (FT-NIR), Fourier transform visible light spectroscopy (FT-VIS), Fourier transform ultraviolet spectroscopy (FT-UV) and Fourier transform terahertz spectroscopy (FT-THz) for the sample 9.

As shown in FIG. 1, the spectroscopic device 100 includes the analysis unit 300 having an analysis optical system 3 and a mirror movement mechanism 1 (a mirror movement mechanism according to the first embodiment), the length measurement unit 400 having a length measurement optical system 4, the periodic signal generation unit 6, and the calculation unit 7.

In order to extract a sample-derived component derived from the sample 9 based on the analysis light L1 while irradiating the sample 9 with the analysis light L1, the analysis optical system 3 splits and mixes the analysis light L1 while changing an optical path length of the analysis light L1, thereby generating interference. In the length measurement optical system 4, a change in the optical path length of the analysis light L1 is measured using length measurement light L2 which is laser light.

The periodic signal generation unit 6 outputs a reference signal Ss toward the calculation unit 7. The calculation unit 7 determines a waveform indicating an intensity of the interference light with respect to the optical path length, that is, the interferogram described above, based on a signal indicating the intensity of the interference light output from the analysis optical system 3 and a signal indicating the change in the optical path length output from the length measurement optical system 4. The calculation unit 7 performs Fourier transform on the interferogram to obtain a spectral pattern.

1.1. Analysis Optical System

The analysis optical system 3 includes a first light source 51, a beam splitter 54, a condensing lens 55, and a neutral density filter 56. In the analysis optical system 3, some of these optical elements may be omitted, or other optical elements may be added, or these optical elements may be replaced with other optical elements.

The first light source 51 is a light source that emits, for example, white light, that is, light obtained by gathering light in a wide wavelength band, as the analysis light L1. The wavelength band of the analysis light L1, that is, a type of the first light source 51, is appropriately selected according to the purpose of spectroscopic analysis performed on the sample 9. When infrared spectroscopic analysis is performed, examples of the first light source 51 include, for example, a halogen lamp, an infrared lamp, and a tungsten lamp. When visible light spectroscopic analysis is performed, examples of the first light source 51 include, for example, a halogen lamp. When ultraviolet spectroscopic analysis is performed, examples of the first light source 51 include a deuterium lamp, and an ultraviolet light emitting diode (UV-LED).

By selecting a wavelength of 100 nm or more and less than 760 nm as the wavelength of the analysis light L1, it is possible to implement the spectroscopic device 100 capable of performing the ultraviolet spectroscopic analysis or the visible light spectroscopic analysis. In addition, by selecting a wavelength of 760 nm or more and 20 μm or less as the wavelength of the analysis light L1, it is possible to implement the spectroscopic device 100 capable of performing the infrared spectroscopic analysis or the near-infrared spectroscopic analysis. Further, by selecting a wavelength of 30 μm or more and 3 mm or less as the wavelength of the analysis light L1, it is possible to implement the spectroscopic device 100 capable of performing terahertz-wave spectroscopic analysis.

The first light source 51 may be provided outside the spectroscopic device 100. In this case, the analysis light L1 emitted from the first light source 51 provided outside may be introduced into the spectroscopic device 100. Meanwhile, by providing the first light source 51 in the spectroscopic device 100 as in the embodiment, alignment accuracy between the first light source 51 and the beam splitter 54 can be particularly enhanced, and loss of the analysis light L1 caused by alignment failure can be reduced to the minimum.

The first light source 51 may be a laser light source that outputs laser light. By using the laser light source as the first light source 51, the spectroscopic device 100 capable 41 of achieving laser excitation spectroscopic analysis such as Fourier Raman spectroscopic analysis and Fourier fluorescence spectroscopic analysis for the sample 9 can be obtained. In this case, the configuration of the analysis optical system 3 may be changed from the above-described configuration. A known light source used for Raman spectroscopy or fluorescence spectroscopy is used as the laser light source.

The analysis light L1 passes through the beam splitter 54, is condensed by the condensing lens 55, and is emitted to the sample 9. The analysis light L1 is reflected off the sample 9 and returns to the beam splitter 54. The configuration described above enables spectroscopic analysis based on reflected light output from the sample 9, that is, analysis using reflection spectroscopy. By changing the optical path of the analysis optical system 3, it is possible to perform spectroscopic analysis based on transmitted light transmitted through the sample 9, that is, analysis using transmission spectroscopy.

For example, a non-polarizing beam splitter is used as the beam splitter 54, and a polarizing beam splitter may instead be used. In this case, a necessary wavelength plate may be appropriately added.

The condensing lens 55 condenses the analysis light L1 and reduces a spot size of the analysis light L1 with which the sample 9 is irradiated. The condensing lens 55 collects diffused light emitted from the sample 9. Accordingly, local analysis is possible. When the local analysis is unnecessary, the condensing lens 55 may be omitted.

The analysis light L1 emitted from the sample 9 includes a sample-derived component generated by an action between the analysis light L1 and the sample 9. The sample-derived component is a component generated by the analysis light L1 acting on the sample 9, and examples of the action include light reflection, scattering, and absorption, emission of a specific wavelength by the sample 9. The analysis light L1 passes through the condensing lens 55, then is reflected by the beam splitter 54, and passes through the neutral density filter 56. The neutral density filter 56 selectively attenuates light of a predetermined wavelength. Accordingly, an S/N ratio (signal-to-noise ratio) of the sample-derived component can be increased, and the spectroscopic analysis can be performed with higher accuracy. Examples of the neutral density filter 56 include a notch filter having an optical density (OD value) of 6.0 or more.

The analysis optical system 3 includes a beam splitter 32 (light splitting unit), a fixed mirror 34 (fixed reflection unit), a condensing lens 35, and a first light receiving element 36, which constitute a Michelson interference optical system. In the analysis optical system 3, a part of these optical elements described above may be omitted, optical elements other than these may be provided, or these optical elements may be replaced by other optical elements.

The beam splitter 32 is a non-polarizing beam splitter that splits the analysis light L1 into two parts including analysis light L1*a* and analysis light L1*b*. Specifically, the beam splitter 32 splits the analysis light L1 into two parts by reflecting a part of the analysis light L1 toward a movement mirror 33 as the analysis light L1*a* and transmitting the other part of the analysis light L1 toward the fixed mirror 34 as the analysis light L1*b*.

Examples of types of the beam splitter 32 include a plate-type element and a stacked-type element in addition to a prism-type element (cube-type element) shown in FIG. 1. Since wavelength dispersion occurs between the analysis light L1*a* and the analysis light L1*b* when the plate-type beam splitter 32 is used, a wavelength dispersion compensator may be disposed between the beam splitter 32 and the fixed mirror 34 if necessary. The wavelength dispersion compensator is an optical element that compensates for wavelength dispersion caused by an optical path length difference between glass materials. In the embodiment, since a prism-type element is used as the beam splitter 32, the wavelength dispersion compensator is unnecessary. The prism-type element is an element in which an optical thin film is sandwiched between prisms. In addition, the stacked-type element is an element in which an optical thin film is sandwiched between two transparent flat plates. The stacked-type element can also eliminate the need for the wavelength dispersion compensator, as the prism-type element. In addition, in the prism-type element and the stacked-type element, long-term reliability of the beam splitter 32 can be enhanced since the optical thin film is not exposed.

In addition, the beam splitter 32 transmits the analysis light L1*a* reflected by the movement mirror 33 toward the first light receiving element 36, and reflects the analysis light L1*b* reflected by the fixed mirror 34 toward the first light receiving element 36. Therefore, the beam splitter 32 mixes the split analysis light L1*a* and L1*b*.

The movement mirror 33 is a mirror that moves in an incident direction of the analysis light L1*a* toward the beam splitter 32 and reflects the analysis light L1*a*. The movement mirror 33 is moved by a driver 80 so as to reciprocate in the incident direction of the analysis light L1*a* described above. A phase of the analysis light L1*a* reflected by the movement mirror 33 changes according to a position of the movement mirror 33. Accordingly, the movement mirror 33 adds phase information derived from the position of the movement mirror 33 to the analysis light L1*a*. The phase information derived from the position of the movement mirror 33 is a change in phase added to the analysis light L1*a* according to the position of the movement mirror 33.

The movement mirror 33 is incorporated in the mirror movement mechanism 1. The mirror movement mechanism 1 includes the movement mirror 33 having a reflecting surface 332, an inner cylinder 81 that supports the movement mirror 33, an outer cylinder 83 provided outside the inner cylinder 81, and the driver 80 that moves the inner cylinder 81 by rotationally driving the inner cylinder 81.

According to the mirror movement mechanism 1, the movement mirror 33 can be translated with high accuracy and with a target movement amount along the incident direction of the analysis light L1*a*. Accordingly, when the movement mirror 33 moves, it is possible to prevent the occurrence of an angular shift (deflection angle) caused by the shift of the movement mirror 33 and to ensure a large movement amount. As a result, it is possible to implement the spectroscopic device 100 (interferometer) capable of enhancing the wavelength resolution (wavenumber resolution) of the spectral information while preventing the influence of the angular shift on an analysis result. The mirror movement mechanism 1 can be easily miniaturized. The mirror movement mechanism 1 will be described in detail later.

The fixed mirror 34 is a mirror whose position is fixed relative to the beam splitter 32 and reflects the analysis light L1*b*. The analysis light L1*b* reflected by the fixed mirror 34 is mixed with the analysis light L1*a* by the beam splitter 32, and is received by the first light receiving element 36 as the interference light. In the analysis optical system 3, an optical path difference occurs between an optical path of the analysis light L1*a* and an optical path of the analysis light L1*b* according to the position of the movement mirror 33. The fixed mirror 34 may be a flat mirror, a corner cube prism, or a corner cube mirror. Among these, by using a corner cube prism, a corner cube mirror, or the like having retroreflective properties as the fixed mirror 34, it is possible to prevent a decrease in the S/N ratio of an interference signal that is caused by the angular shift (deflection angle) of the arrangement of the fixed mirror 34, and thus to prevent the influence on the analysis result.

The condensing lens 35 condenses the interference light, that is, the mixed analysis light L1*a* and L1*b*, onto the first light receiving element 36. Depending on an area of a light receiving portion of the first light receiving element 36, the condensing lens 35 may be omitted.

The first light receiving element 36 receives the interference light and obtains an intensity thereof. A signal indicating a temporal change in intensity is output as a first light receiving signal F(t). The first light receiving signal F(t) contains the sample-derived component generated by the interaction between the analysis light L1 and the sample 9 and the phase information derived from the position of the movement mirror 33 described above.

Examples of the first light receiving element 36 include a photodiode, a phototransistor, and photomultiplier tube (PMT). Among these, examples of the photodiode include an InGaAs-based photodiode, a Si-based photodiode, and an avalanche type photodiode.

1.2. Length Measurement Optical System

The length measurement optical system 4 is a Michelson type interference optical system, and includes a second light source 41, a beam splitter 42, an optical modulator 12, a second light receiving element 45, a ½ wavelength plate 46, a ¼ wavelength plate 47, a ¼ wavelength plate 48, an analyzer 49, and optical path changing mirrors 441 and 442. In the length measurement optical system 4, a part of these optical elements described above may be omitted, optical elements other than these may be provided, or these optical elements may be replaced by other optical elements. The length measurement optical system 4 outputs, by optical heterodyne interferometry, phase information derived from the position of the movement mirror 33 and frequency information derived from a moving speed to the calculation unit 7. In the present specification, such information is referred to as a "length measurement component".

The second light source 41 is preferably a light source that emits light having a narrow spectral line width. Examples of the second light source 41 include gas lasers such as a He—Ne laser and an Ar laser; semiconductor laser elements such as a distributed feedback-laser diode (DFB-LD), a fiber Bragg grating-laser diode (FBG-LD), a vertical cavity surface emitting laser (VCSEL) and a Fabry-Perot laser diode (FP-LD); and crystal lasers such as a yttrium aluminum garnet (YAG) laser.

The second light source 41 is particularly preferably a semiconductor laser element. Accordingly, it is possible to achieve a reduction in size, a reduction in weight, and a reduction in power consumption of the spectroscopic device 100.

The beam splitter 42 is a polarizing beam splitter that transmits P-polarized light and reflects S-polarized light. The ½ wavelength plate 46 is disposed with an optical axis thereof rotated with respect to a polarization axis of the length measurement light L2. Accordingly, when the length measurement light L2 passes through the ½ wavelength plate 46, it becomes linearly polarized light including the P-polarized light and the S-polarized light, and is split into two parts including the P-polarized light and the S-polarized light by the beam splitter 42.

Length measurement light L2*a*, which is the S-polarized light, is converted into circularly polarized light by the ¼ wavelength plate 48 and is incident on the optical modulator 12. The optical modulator 12 reflects the length measurement light L2*a* to add a modulation component to the length measurement light L2*a*. The modulation component is a change in frequency that occurs when the length measurement light L2*a* is reflected by a resonator element 30. The reflected length measurement light L2*a* returns to the beam splitter 42. At this time, the length measurement light L2*a* is converted into the P-polarized light by the ¼ wavelength plate 48.

The length measurement light L2*b*, which is the P-polarized light, is converted into circularly polarized light by the ¼ wavelength plate 47, and is incident on the movement mirror 33 via the optical path changing mirrors 441 and 442. The length measurement light L2*b* is incident on the same reflecting surface 332 as the analysis light L1*a* and is reflected. Accordingly, a phase of the length measurement light L2*b* changes according to the position of the movement mirror 33. The length measurement light L2*b* reflected by the movement mirror 33 returns to the beam splitter 42 via the optical path changing mirrors 441 and 442.

In the embodiment, the analysis light L1*a* and the length measurement light L2*b* are incident on the same reflecting surface 332 of the movement mirror 33, as described above. In this case, the phase information added to the analysis light L1*a* and the phase information added to the length measurement light L2*b* are information derived from the position of the same reflecting surface 332. Therefore, the correlation between the two pieces of phase information is enhanced, thereby improving accuracy of a final analysis result.

The beam splitter 42 mixes the length measurement light L2*a* returned from the optical modulator 12 with the length measurement light L2*b* reflected by the movement mirror 33. The mixed length measurement light L2*a* and L2*b* is transmitted through the analyzer 49 and enters the second light receiving element 45.

An example of the optical modulator 12 is an optical modulator disclosed in JP-A-2022-38156. In the embodiment, the optical modulator 12 includes the resonator element 30. The resonator element 30 vibrates in response to an element drive signal Sd and reflects the length measurement light L2*a*. Accordingly, the optical modulator 12 superimposes a modulation component on the length measurement light L2*a*. The optical modulator 12 may be any optical frequency shifter, and may be, for example, an acousto-optic modulator (AOM) or an electro-optic modulator (EOM).

Examples of the resonator element 30 include a quartz crystal resonator, a silicon resonator, and a ceramic resonator. These resonators are resonators that utilize a mechanical resonance phenomenon, and therefore have a high Q value and can easily stabilize a natural frequency. Accordingly, the S/N ratio of the modulation component applied to the length measurement light L2 by the optical modulator 12 can be increased, and accuracy of the reference signal Ss can be enhanced. As a result, the position of the movement mirror 33 can be determined with higher accuracy, and finally, the spectroscopic device 100 capable of generating a spectral pattern with high accuracy on the wavelength axis (wavenumber axis) can be implemented.

Examples of a quartz crystal resonator include a quartz crystal AT resonator, an SC-cut quartz crystal resonator, a tuning fork type quartz crystal resonator, and a quartz crystal surface acoustic wave element. An oscillation frequency of the quartz crystal resonator is, for example, from about 1 kHz to several hundreds of MHz.

A silicon resonator is a resonator including a single-crystal silicon piece manufactured from a single-crystal silicon substrate using an MEMS technology, and a piezoelectric film. Micro electro mechanical systems (MEMS) refers to micro-scale electromechanical systems. Examples of a shape of the single-crystal silicon piece include a cantilever beam shape such as a two-legged tuning fork type and a three-legged tuning fork type, and a both-ended beam shape. An oscillation frequency of the silicon resonator is, for example, from about 1 kHz to several hundreds of MHZ.

A ceramic resonator is a resonator including an electrode and a piezoelectric ceramic piece manufactured by sintering a piezoelectric ceramic. Examples of the piezoelectric ceramic include lead zirconate titanate (PZT) and barium titanate (BTO). An oscillation frequency of the ceramic resonator is, for example, from about several hundreds of kHz to several tens of MHZ.

Figure 3:
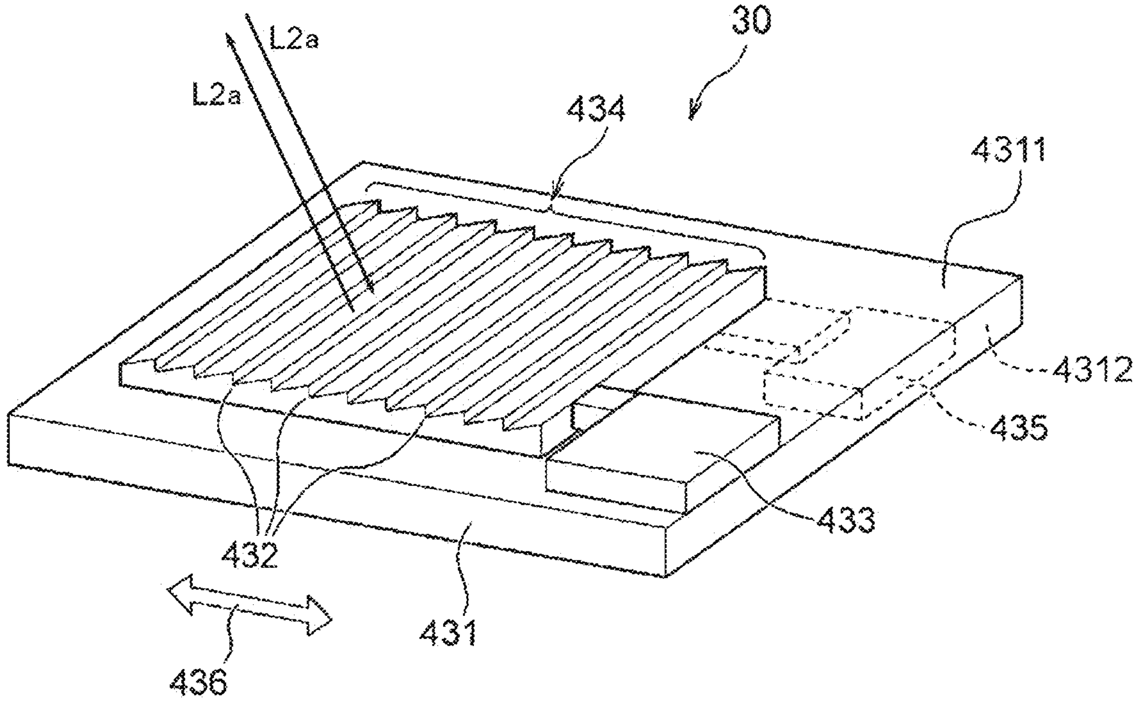
FIG. 3 is a perspective view showing a configuration example of a resonator element shown in FIG. 1.

FIG. 3 is a perspective view showing a configuration example of the resonator element 30 shown in FIG. 1.

The resonator element 30 shown in FIG. 3 includes a plate-shaped resonator element 431 and a diffraction grating 434 provided on the resonator element 431.

The resonator element 431 is made of a material that repeats a resonating mode to be distorted in a direction along a surface when a potential is applied thereto. The resonator element 431 shown in FIG. 3 is a quartz crystal AT resonator that vibrates through thickness shear along a vibration direction 436 in a high frequency range of a MHz band. The diffraction grating 434 is provided on a front surface of the resonator element 431. The diffraction grating 434 includes grooves 432 having a component intersecting the vibration direction 436, that is, a plurality of linear grooves 432 extending in a direction intersecting the vibration direction 436.

The resonator element 431 has a front surface 4311 and a back surface 4312, which are in a front-and-back relationship with each other. The diffraction grating 434 is disposed at the front surface 4311. A pad 433 for applying a potential to the resonator element 431 is provided on the front surface 4311. Further, a pad 435 for applying a potential to the resonator element 431 is also provided on the back surface 4312.

A size of the resonator element 431 is, for example, about 0.50 mm or more and 10.0 mm or less in terms of a long side. The thickness of the resonator element 431 is, for example, about 0.10 mm or more and 2.0 mm or less. As an example, a shape of the resonator element 431 is a square with one side of 1.6 mm, and a thickness thereof is 0.35 mm.

A size of the diffraction grating 434 is, for example, about 0.20 mm or more and 3.0 mm or less in terms of a long side. A thickness of the diffraction grating 434 is, for example, about 0.003 mm or more and 0.50 mm or less.

In the embodiment, although the resonator element 431 vibrates in a thickness-shear manner, since the vibration is an in-plane vibration, as shown as the vibration direction 436 in FIG. 3, even when light is perpendicularly incident to the front surface of the resonator element 431 alone, optical modulation cannot be Therefore, in the resonator element 30, the performed. optical modulation is enabled by providing the diffraction grating 434 in the resonator element 431.

The diffraction grating 434 shown in FIG. 3 is, for example, a blazed diffraction grating. The blazed diffraction grating refers to a grating in which a cross-sectional shape of the diffraction grating is stepped. The shape of the diffraction grating 434 is not limited thereto.

Figure 4:
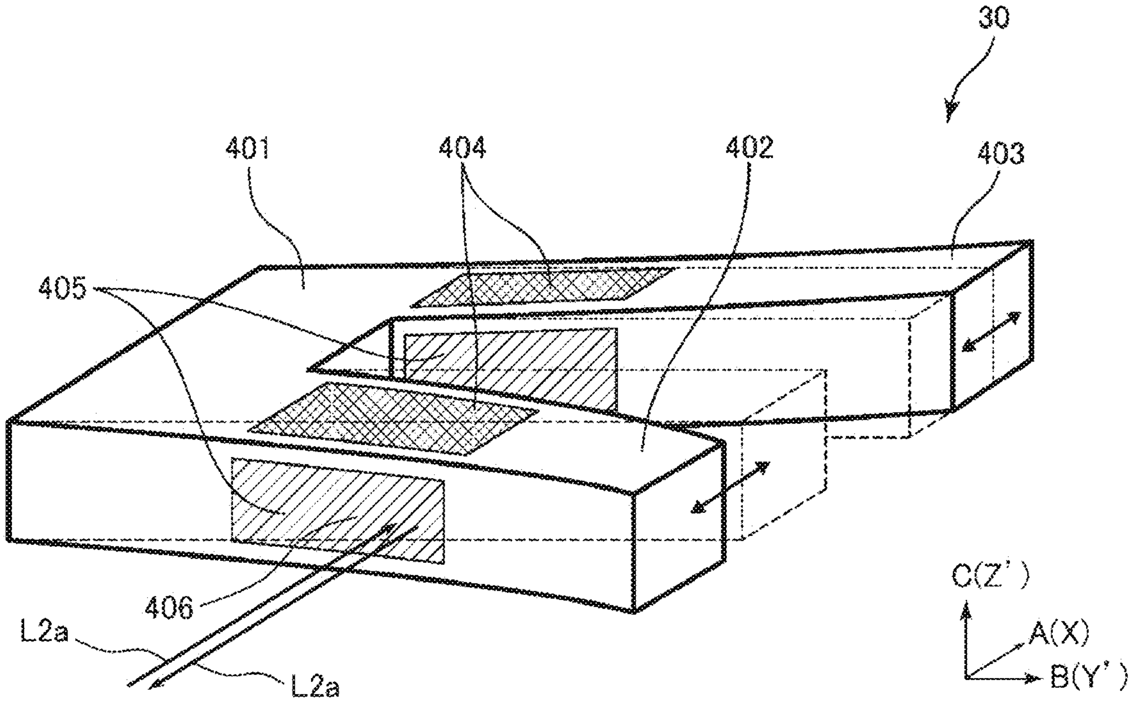
FIG. 4 is a perspective view showing another configuration example of the resonator element shown in FIG. 1.

FIG. 4 is a perspective view showing another configuration example of the resonator element 30 shown in FIG. 1. In FIG. 4, an A-axis, a B-axis, and a C-axis are set as three axes orthogonal to one another, and are indicated by arrows. A tip side of the arrow is defined as "positive", and a base end side of the arrow is defined as "negative". For example, both positive and negative directions of the A-axis are referred to as an "A-axis direction". A B-axis direction and a C-axis direction are defined in the same manner.

The resonator element 30 shown in FIG. 4 is a tuning fork type quartz crystal resonator. The resonator element 30 shown in FIG. 4 includes a vibration substrate including a base portion 401, a first vibrating arm 402, and a second vibrating arm 403. Such a tuning fork type quartz crystal resonator is easily available because a manufacturing technique is established, and oscillation is also stable. Therefore, the tuning fork type quartz crystal resonator is suitable as the resonator element 30. The resonator element 30 includes electrodes 404 and 405 and a light reflecting surface 406 which are provided on the vibration substrate.

The base portion 401 is a portion extending along the A-axis. The first vibrating arm 402 is a portion extending from an end of the base portion 401 on the negative side of the A-axis toward the positive side of the B-axis. The second vibrating arm 403 is a portion extending from an end of the base portion 401 on the positive side of the A-axis toward the positive side of the B-axis.

The electrodes 404 are electrically conductive films provided at side surfaces parallel to an A-B plane of the first vibrating arm 402 and the second vibrating arm 403. Although not shown in FIG. 4, the electrodes 404 are provided at side surfaces facing each other, and drive the first vibrating arm 402 and the second vibrating arm 403 when voltages having different polarities are applied to the electrodes 404.

The electrodes 405 are electrically conductive films provided at side surfaces intersecting the A-B plane of the first vibrating arm 402 and the second vibrating arm 403. Although not shown in FIG. 4, the electrodes 405 are also provided at side surfaces facing each other, and drive the first vibrating arm 402 and the second vibrating arm 403 when voltages having different polarities are applied to the electrodes 405.

The light reflecting surface 406 is set on a side surface intersecting the A-B plane of the first vibrating arm 402 and the second vibrating arm 403, and has a function of reflecting the length measurement light L2*a*. The side surface refers to a surface spreading along the extending direction of the first vibrating arm 402 and the second vibrating arm 403. The light reflecting surfaces 406 shown in FIG. 4 are set on side surfaces of the first vibrating arm 402, particularly on front surfaces of the electrodes 405. The electrode 405 provided on the first vibrating arm 402 also has a function as the light reflecting surface 406. A light reflection film (not shown) may be provided separately from the electrode 405.

As the tuning fork type quartz crystal resonator, a quartz crystal piece cut from a quartz crystal substrate is used. An example of the quartz crystal substrate used to manufacture the tuning fork type quartz crystal resonator is a quartz crystal Z-cut flat plate. An X-axis parallel to the A-axis, a Y'-axis parallel to the B-axis, and a Z'-axis parallel to the C-axis are set in FIG. 4. The quartz crystal Z-cut flat plate is, for example, a substrate cut from a single crystal of quartz crystal such that the X-axis is an electrical axis, the Y'-axis is a mechanical axis, and the Z'-axis is an optical axis. Specifically, in an orthogonal coordinate system including the X-axis, the Y'-axis and the Z'-axis, a substrate having a principal surface inclining with respect to an X-Y' plane containing the X-axis and the Y'-axis by about 1° to 5° in a counterclockwise direction around the X-axis is cut from a single crystal of quartz crystal and is preferably used as the quartz crystal substrate. By etching such a quartz crystal substrate, a quartz crystal piece used in the resonator element 30 shown in FIG. 4 is obtained. The etching may be wet etching or dry etching.

Alternatively, the light reflecting surface 406 can be set on the front surface of the electrode 404. In this case, in order to make the tuning fork type quartz crystal resonator perform an out-of-plane vibration, specifically, in order to excite a mode (including spurious component) that performs the out-of-plane vibration, a signal to be applied to each electrode may be adjusted.

The second light receiving element 45 receives the mixed length measurement light L2*a* and L2*b* as the interference light, and obtains an intensity thereof. A signal indicating a temporal change in intensity is output as a second light receiving signal S2. The second light receiving signal S2 contains a length measurement component derived from the position of the movement mirror 33.

Examples of the second light receiving element 45 include a photodiode and a phototransistor.

Although the optical elements included in each optical system are described above, it is preferable that an anti-reflection treatment is applied to an optical element that requires light to be incident thereon. Accordingly, S/N ratios of the first light receiving signal F(t) and the second light receiving signal S2 can be increased.

1.3. Periodic Signal Generation Unit

The periodic signal generation unit 6 shown in FIG. 2 generates a periodic signal and outputs the periodic signal as the reference signal Ss. In the embodiment, the periodic signal generation unit 6 includes an oscillation circuit 62.

An example of the oscillation circuit 62 is an oscillation circuit disclosed in JP-A-2022-38156. The oscillation circuit 62 operates with the resonator element 30 as a signal source and generates a periodic signal with high accuracy. Accordingly, the oscillation circuit 62 outputs the element drive signal Sd and the reference signal Ss with high accuracy. Therefore, the element drive signal Sd and the reference signal Ss are influenced in the same way when subjected to a disturbance. As a result, the modulation component added via the resonator element 30 driven by the element drive signal Sd and the reference signal Ss are also influenced in the same way. Therefore, when the second light receiving signal S2 and the reference signal Ss are subjected to calculation in the calculation unit 7, the influence of disturbances contained in both signals can be canceled out or reduced in the process of calculation. As a result, the calculation unit 7 can determine the position of the movement mirror 33 with higher accuracy even when subjected to the disturbance.

The oscillation circuit disclosed in the publication described above is a circuit using an inverter IC, but a Colpitts oscillation circuit can be used instead thereof.

In addition, the periodic signal generation unit 6 is not particularly limited as long as it has the function of generating a periodic signal. For example, the periodic signal generation unit may be a signal generator or a function generator.

1.4. Mirror Movement Mechanism

Figure 5:
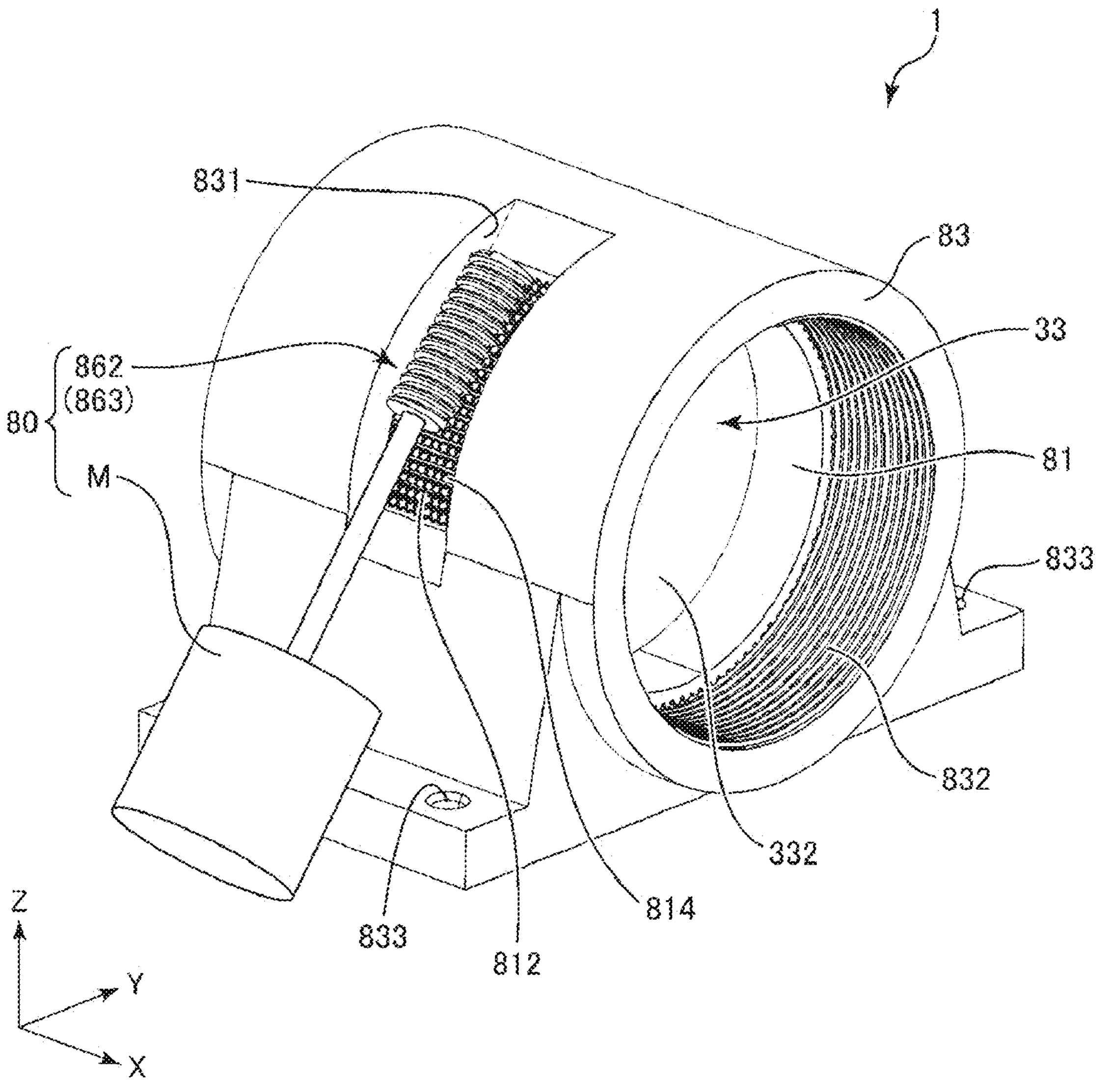
FIG. 5 is a perspective view showing the mirror movement mechanism shown in FIG. 1 (mirror movement mechanism according to the first embodiment).
Figure 6:
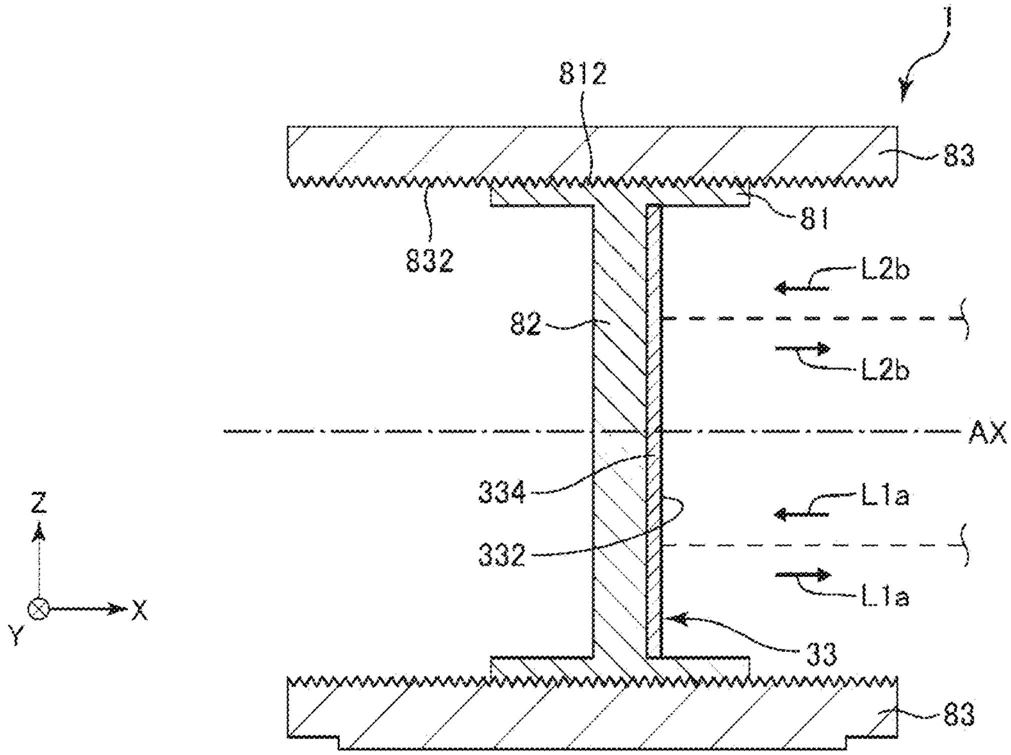
FIG. 6 is a cross-sectional view of the mirror movement mechanism shown in FIG. 5.

FIG. 5 is a perspective view showing the mirror movement mechanism 1 shown in FIG. 1 (mirror movement mechanism according to the first embodiment). FIG. 6 is a cross-sectional view of the mirror movement mechanism 1 shown in FIG. 5. In the drawings of the present application, three axes orthogonal to one another are set as the X-axis, the Y-axis, and the Z-axis. Each axis is indicated by an arrow, and a tip side of the arrow is defined as "positive", and a base end side of the arrow is defined as "negative". In the following description, for example, an "X-axis direction" includes both a positive direction and a negative direction of the X-axis. The same applies to a Y-axis direction and a Z-axis direction. In the following description, in particular, the positive side of the Z axis is also referred to as "upper", and the negative side of the Z axis is also referred to as "lower".

The mirror movement mechanism 1 shown in FIG. 5 includes the movement mirror 33, the inner cylinder 81, the outer cylinder 83, and the driver 80. The movement mirror 33 has the reflecting surface 332. As shown in FIG. 6, the inner cylinder 81 supports the movement mirror 33 on its inner surface, and has a first screw groove 812 extending around a central axis AX on, for example, the entire or part of its outer surface. The outer cylinder 83 has a second screw groove 832 on the entire or part of the inner surface. The first screw groove 812 and the second screw groove 832 screw together. The driver 80 drives and rotates the inner cylinder 81 about the central axis AX as a rotation axis, thereby screwing the first screw groove 812 into the second screw groove 832 and moving the inner cylinder 81 in the direction of the central axis AX.

The first screw groove 812 and the second screw groove 832 extend spirally around the central axis AX. When such screw grooves are screwed together, the first screw groove 812 and the second screw groove 832 are maintained in contact over the entire circumference around the central axis AX or over most of the circumference. The above state is also maintained when the inner cylinder 81 is rotated. Therefore, when the inner cylinder 81 is rotationally driven, the inner cylinder 81 can be moved while minimizing a shift of the inner cylinder 81 relative to the outer cylinder 83. As a result, the translational performance of the movement of the movement mirror 33 can be enhanced, and occurrence of an angular shift (deflection angle) of the movement mirror 33 can be prevented.

The mirror movement mechanism 1 can prevent a shift of the movement mirror 33 during movement without using a large guide mechanism or the like. Therefore, it is possible to implement the mirror movement mechanism 1 that can be easily miniaturized. As a result, an interferometer that is reduced in size, weight, and cost can be implemented.

Further, according to the above-described configuration, the movement amount of the movement mirror 33 can be easily increased, as compared with a mirror movement mechanism using, for example, micro electro mechanical systems (MEMS). Therefore, it is possible to easily enhance the wavelength resolution (wavenumber resolution) of the spectral pattern that can be acquired by the spectroscopic device 100 (interferometer).

A length of the inner cylinder 81 in the direction of the central axis AX is shorter than that of the outer cylinder 83. Therefore, even when the inner cylinder 81 is moved in the X-axis direction by the driver 80, the state in which the first screw groove 812 and the second screw groove 832 are screwed together is easily maintained. Accordingly, a sufficiently long moving distance of the movement mirror 33 can be ensured.

The length of the outer cylinder 83 in the direction of the central axis AX is preferably longer than a distance by which the driver 80 moves the inner cylinder 81. Accordingly, the first screw groove 812 and the second screw groove 832 can be screwed together over the entire range of the movement amount of the movement mirror 33. As a result, the occurrence of the deflection angle can be prevented over the entire range of the movement amount of the movement mirror 33.

The material of the inner cylinder 81 and the outer cylinder 83 is not particularly limited, and examples thereof include metal materials, ceramic materials, glass materials, and resin materials. In addition, a composite material containing at least one of these materials may be used. Among these, the metal material is preferably used. The metal material has high rigidity and hardness, and therefore can particularly enhance the translational performance of the movement of the movement mirror 33. Examples of the metal material include stainless steel, aluminum alloys, and titanium alloys.

The movement mirror 33 shown in FIG. 6 has a substrate 334 and the reflecting surface 332 provided on one surface of the substrate 334. Examples of the substrate 334 include a glass plate, a resin plate, and a metal plate. The reflecting surface 332 may be, for example, a front surface of a metal film formed on the substrate 334, or may be a front surface of the substrate 334 subjected to mirror polishing. According to such a configuration, since the movement mirror 33 can be produced by a procedure of providing the reflecting surface 332 on the substrate 334 in advance and then attaching it, the reflecting surface 332 with high surface accuracy can be obtained. The substrate 334 may be omitted. In this case, a front surface of a wall 82 or a front surface of a metal film or the like formed on the wall 82 may be the reflecting surface 332.

A method for supporting the movement mirror 33 against the wall 82 is not particularly limited. For example, the movement mirror 33 is supported by the wall 82 via an adhesive or an adhesive sheet.

In addition, the inner surface of the inner cylinder 81 may be subjected to a stray light reduction treatment, if necessary. Examples of the stray light reduction treatment include anodizing (alumite) treatment, anti-reflection sheet attachment treatment, and flocked paper attachment treatment. Accordingly, it is possible to prevent occurrence of stray light caused by diffuse reflection. As a result, it is possible to prevent a decrease in the S/N ratio of the interference signal caused by the stray light.

The central axis AX extends along the X-axis. Further, the inner cylinder 81 has a cylindrical shape with the central axis AX. The wall 82 intersecting the central axis AX is fixed to the inner surface of the inner cylinder 81. The position of the wall 82 is not particularly limited as long as the wall 82 is fixed to the inner surface of the inner cylinder 81, and in FIG. 6, the wall 82 is provided in a middle portion of the inner cylinder 81 in the direction of the central axis AX. Further, the movement mirror 33 is supported by the wall 82. According to such a configuration, even when dust is generated as a result of the screwing of the first screw groove 812 and the second screw groove 832, the generated dust is less likely to adhere to the reflecting surface 332 of the movement mirror 33. That is, since a sufficient distance can be ensured between the end of the inner cylinder 81 and the movement mirror 33 in the X-axis direction, probability that the dust generated during screwing adheres to the movement mirror 33 can be reduced. By providing the wall 82 in the middle portion of the inner cylinder 81, even when the inner cylinder 81 swings relative to the outer cylinder 83, specifically, even when the inner cylinder 81 swings around the Y-axis as a pivot axis, an unintended displacement range of the reflecting surface 332 can be prevented. Accordingly, it is possible to prevent a decrease in the S/N ratio of the interference signal that is caused by a decrease in the reflectance of the reflecting surface 332 or a displacement of the reflecting surface 332 due to swing. The middle portion refers to a range of 40% or more and 60% or less of the entire length from the end of the inner cylinder 81.

The outer cylinder 83 shown in FIG. 5 has a window portion 831 penetrating from the outer surface to the inner surface. The outer surface of the inner cylinder 81 can be exposed through the window portion 831.

In the embodiment, a first linear groove 814 is provided on the outer surface of the inner cylinder 81. The first linear groove 814 intersects with the first screw groove 812. More specifically, the first linear groove 814 extends parallel to the central axis AX. The first linear groove 814 may be inclined with respect to the central axis AX.

The driver 80 shown in FIG. 1 has a motor M and a power conversion unit 862. The motor M generates a rotational output, and the power conversion unit 862 shown in FIG. 5 includes a worm gear 863 connected to an output shaft of the motor M, and transmits the rotational output to the inner cylinder 81. Specifically, the worm gear 863 is screwed into the first linear groove 814 exposed from the window portion 831. Accordingly, the rotation of the worm gear 863 can be transmitted to the inner cylinder 81. Therefore, the movement mirror 33 can be moved by any movement amount corresponding to a rotation amount of the worm gear 863. That is, the driver 80 converts the rotational output of the motor M into a translational motion of the movement mirror 33. When the power conversion unit 862 includes the worm gear 863, a reduction ratio of the power conversion unit 862 can be increased, and a backlash can be reduced to be small. Accordingly, since it is not necessary to add a speed reducer or the like, it is possible to easily reduce the size of the driver 80 and easily enhance positional accuracy of the movement mirror 33.

The motor M generates a rotational output in a predetermined rotational direction and at a predetermined rotational speed. Examples of the motor M include a stepping motor, a DC motor, and an ultrasonic (piezo) motor.

Among these, in the embodiment, the DC motor is preferably used. The DC motor can generate sufficient torque even though it is small, and therefore can contribute to the reduction in size of the mirror movement mechanism 1. Examples of the DC motor include a brushed DC motor and a brushless DC motor, and the brushless DC motor is preferably used. Since the rotational speed of the brushless DC motor can be easily controlled based on an applied voltage, the moving speed of the movement mirror 33 can be easily controlled.

In the embodiment, as described above, the analysis light L1*a* and the length measurement light L2*b* are incident on the same reflecting surface 332 of the movement mirror 33. Incident positions of the analysis light L1*a* and the length measurement light L2*b* are preferably different from each other. Accordingly, it is possible to prevent both types of light from being mixed.

The incident position of the length measurement light L2*b* may be set at an intersection of the reflecting surface 332 and the central axis AX. The intersection is less likely to be displaced in the X-axis direction even when the inner cylinder 81 is rotationally driven. That is, even when the reflecting surface 332 is slightly inclined with respect to the central axis AX, the displacement is reduced to be small in the vicinity of the intersection. The length measurement light L2*b* is continuously emitted onto the same position of the reflecting surface 332. Therefore, compared to a case in which various positions are irradiated with the light as the reflecting surface 332 rotates, the reflectance is less likely to be unintentionally changed due to contamination or the like. Therefore, by setting the incident position of the length measurement light L2*b* at the intersection, it is possible to prevent a decrease in the S/N ratio of the length measurement component due to the displacement of the reflecting surface 332. The incident position of the length measurement light L2*b* being set at the intersection refers to a state in which the intersection of the reflecting surface 332 and the central axis AX is included within the irradiation range of the length measurement light L2*b*.

The outer cylinder 83 has screw holes 833. The screw holes 833 are used to fix the outer cylinder 83 to a base material or the like (not shown) using screws (not shown). The number of the screw holes 833 is not particularly limited, and is preferably three or more in view of stably fixing the outer cylinder 83.

The configuration of the driver 80 is not limited to the above as long as the driver 80 has a function of rotationally driving the inner cylinder 81 with the central axis AX as a rotation axis.

1.5. Calculation Unit

The calculation unit 7 shown in FIG. 2 includes a movement mirror position calculation unit 72, a light intensity calculation unit 74, and a Fourier transform unit 76. Functions exhibited by these functional units are implemented by hardware including, for example, a processor, a memory, an external interface, an input unit, and a display unit. Specifically, the functions are achieved by the processor reading and executing a program stored in memory. These components can communicate with one another by an external bus.

Examples of the processor may include a central processing unit (CPU) and a digital signal processor (DSP). Instead of a method in which the processor executes software, a method in which a field-programmable gate array (FPGA), an application specific integrated circuit (ASIC), or the like implements the above-described functions may be adopted.

Examples of the memory include a hard disk drive (HDD), a solid state drive (SSD), an electrically erasable programmable read-only memory (EEPROM), a read-only memory (ROM), and a random access memory (RAM).

Examples of the external interface include a digital input and output port such as a universal serial bus (USB) and an Ethernet (registered trademark) port.

Examples of the input unit include various input devices such as a keyboard, a mouse, a touch panel, and a touch pad. Examples of the display unit include a liquid crystal display panel and an organic electro luminescence (EL) display panel. The input unit and the display unit may be provided as necessary, and may be omitted.

1.5.1. Movement Mirror Position Calculation Unit

The movement mirror position calculation unit 72 shown in FIG. 2 identifies the position of the movement mirror 33 based on an optical heterodyne interferometry, and generates the movement mirror position signal X(t) based on an identification result thereof. Specifically, since the length measurement optical system 4 includes the optical modulator 12, it is possible to add the modulation component to the length measurement light L2*a*. Further, when the length measurement light L2*a* and L2*b* interfere with each other, the length measurement component derived from the position of the movement mirror 33 can be obtained with high accuracy from the interference light thus obtained. Further, the calculation unit 7 can determine the movement mirror position signal X(t) with high accuracy based on the length measurement component. According to the optical heterodyne interferometry, extraction of the length measurement component is less susceptible to the influence of disturbances, in particular, the influence of stray light having a frequency that becomes noise, and has high robustness.

The movement mirror position calculation unit 72 shown in FIG. 2 includes a preprocessing unit 722, a demodulation processing unit 724, and a movement mirror position signal output unit 726. The preprocessing unit 722 and the demodulation processing unit 724 may be, for example, a preprocessing unit and a demodulation unit disclosed in JP-A-2022-38156.

The preprocessing unit 722 performs preprocessing on the second light receiving signal S2 based on the reference signal Ss. The demodulation processing unit 724 demodulates a length measurement component derived from the position of the movement mirror 33 based on the reference signal Ss from a preprocessed signal output from the preprocessing unit 722. That is, the demodulation processing unit 724 demodulates the length measurement component based on the reference signal Ss which is the periodic signal generated by the periodic signal generation unit 6, and the second light receiving signal S2.

The movement mirror position signal output unit 726 generates and outputs the movement mirror position signal X(t) based on the length measurement component derived from the movement mirror 33 demodulated by the demodulation processing unit 724. The movement mirror position signal X(t) determined by the method described above is a signal representing a position of the movement mirror 33 which changes with time, and captures the displacement of the movement mirror 33 at an interval sufficiently narrower than a wavelength of the length measurement light L2. For example, when the wavelength of the length measurement light L2 is several hundred of nanometers, a position resolution of the movement mirror position signal X(t) can be less than 10 nm. Therefore, the light intensity calculation unit 74 can generate accurate digital data of the interferogram F(x).

Figure 7:
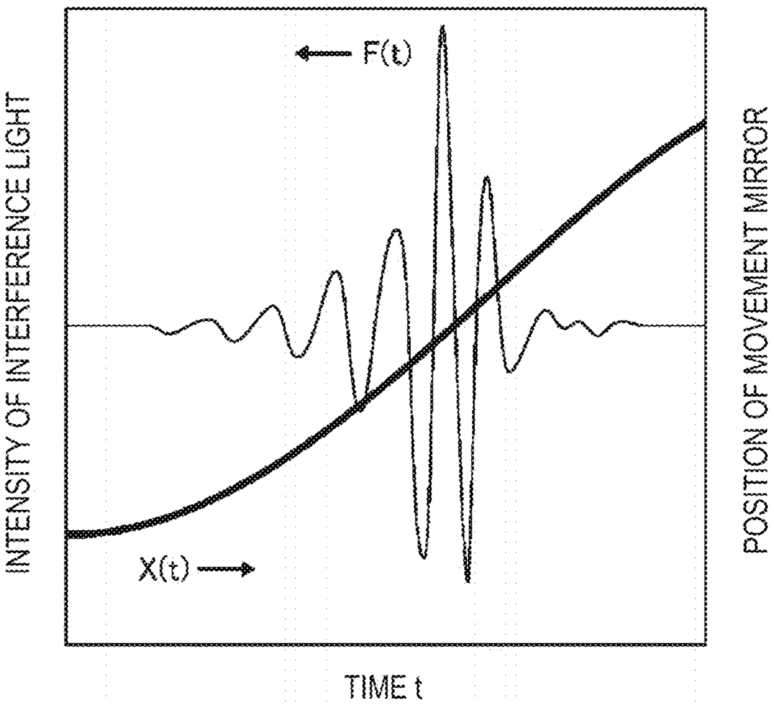
FIG. 7 is a diagram showing an example of a first light receiving signal and a movement mirror position signal obtained by the spectroscopic device shown in FIG. 1.

FIG. 7 is a diagram showing an example of the first light receiving signal F(t) and the movement mirror position signal X(t) obtained by the spectroscopic device 100 shown in FIG. 1. A horizontal axis in FIG. 7 indicates a time t, and a vertical axis indicates the intensity of the interference light incident on the first light receiving element 36 or the position of the movement mirror 33.

The movement mirror position signal X(t) shown in FIG. 7 is an image of a signal that continuously detects changes in the position of the movement mirror 33 and achieves a high position resolution. Therefore, by generating the interferogram F(x) based on such a movement mirror position signal X(t), the interferogram F(x) having a larger number of data points can be obtained. The large number of data points means a short sampling interval of the interferogram F(x) and high accuracy. Therefore, finally, a spectral pattern with high wavelength resolution (wavenumber resolution) can be obtained.

In addition, since the sampling interval can be shortened, the interferogram F(x) having a sufficient number of data points can be obtained even when the analysis light L1 having a shorter wavelength (having a larger wavenumber) is used. Accordingly, it is possible to obtain a spectral pattern in a wider wavelength range (wide wavenumber range), that is, a spectral pattern in a wider band.

1.5.2. Light Intensity Calculation Unit

The light intensity calculation unit 74 generates, based on the first light receiving signal F(t) and the movement mirror position signal X(t), a waveform (interferogram F(x)) representing the intensity of the interference light with respect to the position of the movement mirror 33.

As described above, the first light receiving signal F(t) includes the sample-derived component and the phase information derived from the movement mirror 33. The light intensity calculation unit 74 extracts an intensity of the first light receiving signal F(t) based on the movement mirror position signal X(t). Then, the light intensity calculation unit 74 generates the interferogram F(x) based on the position of the movement mirror 33 which is determined based on the movement mirror position signal X(t), and the intensity of the first light receiving signal F(t). The interferogram F(x) is represented by a function of an optical path difference between reflected light from the movement mirror 33 and reflected light from the fixed mirror 34 in the analysis optical system 3 and the intensity of the interference light received by the first light receiving element 36 (intensity of the first light receiving signal F(t)).

Figure 8:
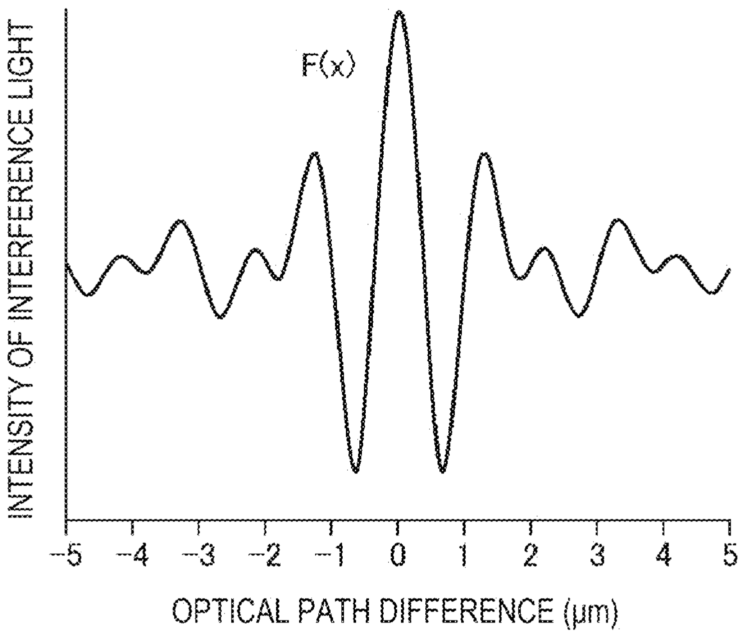
FIG. 8 is a diagram showing an example of an interferogram.

FIG. 8 is a diagram showing an example of the interferogram F(x). A horizontal axis of FIG. 8 indicates the optical path difference in the analysis optical system 3, and a vertical axis indicates the intensity of the interference light. The optical path difference in the analysis optical system 3 is a difference between an optical path length between the beam splitter 32 and the movement mirror 33 and an optical path length between the beam splitter 32 and the fixed mirror 34. In FIG. 8, a zero optical path difference is taken as an origin of the horizontal axis.

1.5.3. Fourier Transform Unit

The Fourier transform unit 76 performs the Fourier transform on the interferogram F(x). Accordingly, a spectral pattern including information unique to the sample 9 is obtained.

Figure 9:
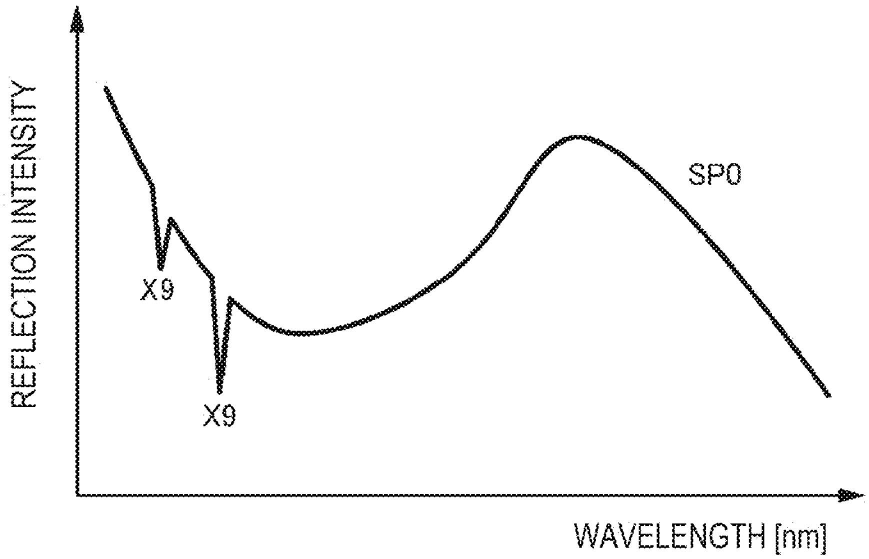
FIG. 9 is an example of a spectral pattern obtained by performing spectroscopic analysis on a sample.

FIG. 9 is an example of a spectral pattern SP0 obtained by performing spectroscopic analysis on the sample 9. The spectral pattern SP0 is an example of a reflection spectrum of the sample 9.

In the spectral pattern SP0 shown in FIG. 9, the sample-derived component generated by the analysis light L1 acting on the sample 9 is reflected as an absorption peak X9. According to the spectroscopic device 100, characteristics of the sample 9, for example, a material, a structure, and a component amount, can be analyzed based on the spectral pattern SP0.

The spectral pattern SP0 is generated by performing Fourier transform on the interferogram F(x). Since the interferogram F(x) is an electric field amplitude waveform obtained by using the position of the movement mirror 33 as a parameter, the spectral pattern SP0 obtained by performing Fourier transform on the electric field amplitude waveform has wavelength information. The position of the movement mirror 33 is directly linked to wavenumber accuracy of the spectral pattern SP0. Therefore, according to the spectroscopic device 100 according to embodiment, since the position of the movement mirror 33 can be more accurately determined, it is possible to generate the spectral pattern SP0 with high accuracy on the wavelength axis (wavenumber axis). According to the embodiment, it is possible to prevent the decrease in the S/N ratio of the first light receiving signal F(t) and the decrease in the S/N ratio of the second light receiving signal S2 that are caused by shift during movement of the movement mirror 33, thereby preventing the decrease in the accuracy of the spectral pattern SP0.

2. Modification of First Embodiment

Next, a modification of the first embodiment will be described. In the following description, differences from the first embodiment will be mainly described, and a description of similar matters will be omitted.

Figure 10:
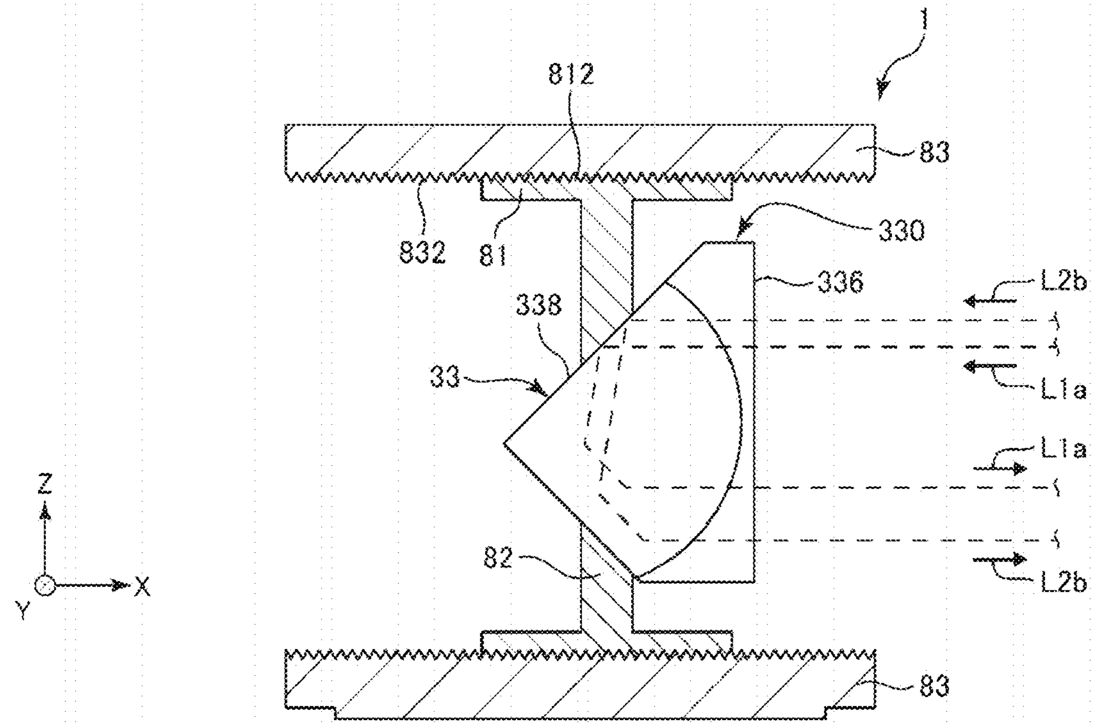
FIG. 10 is a cross-sectional view showing a mirror movement mechanism according to a first modification of the first embodiment.

FIG. 10 is a cross-sectional view showing the mirror movement mechanism 1 according to a first modification of the first embodiment. In FIG. 10, the components same as those in the first embodiment are denoted by the same reference numerals.

The first modification is similar to the first embodiment, except that the movement mirror 33 has a corner cube prism 330 instead of the substrate 334.

The corner cube prism 330 shown in FIG. 10 includes an incident surface 336 and a retroreflective surface 338. The incident surface 336 is a surface on which the analysis light L1*a* and the length measurement light L2*b* are incident, and is formed of a flat surface. When light is incident on the incident surface 336, the light enters the corner cube prism 330, is reflected by the retroreflective surface 338, and is again emitted from the incident surface 336. The retroreflective surface 338 is configured with a surface of a corner of a cube (cubic body), and causes internal reflection three times. Accordingly, the light emitted from incident surface 336 can return in a direction same as the incident direction. As a result, even when the deflection angle is large, the positions where the reflected analysis light L1*a* and the reflected length measurement light L2*b* return are less likely to change, and thus loss of a light intensity caused by the deflection angle can be minimized.

Such a corner cube prism 330 has retroreflective properties regardless of, for example, an incident angle of light with respect to the incident surface 336. In addition, in the corner cube prism 330, the retroreflective properties can be achieved by one member.

Instead of the corner cube prism 330, a corner cube mirror may be used. The corner cube mirror is also called a hollow retroreflector, and has retroreflective properties that are the same as those of the corner cube prism 330. Examples of the corner cube mirror include a mounted mirror having three mirrors fixed to a mount member, and a replica mirror having a replica member having three mutually perpendicular surfaces and a film of a mirror material such as a metal formed on the replica member.

Figure 11:
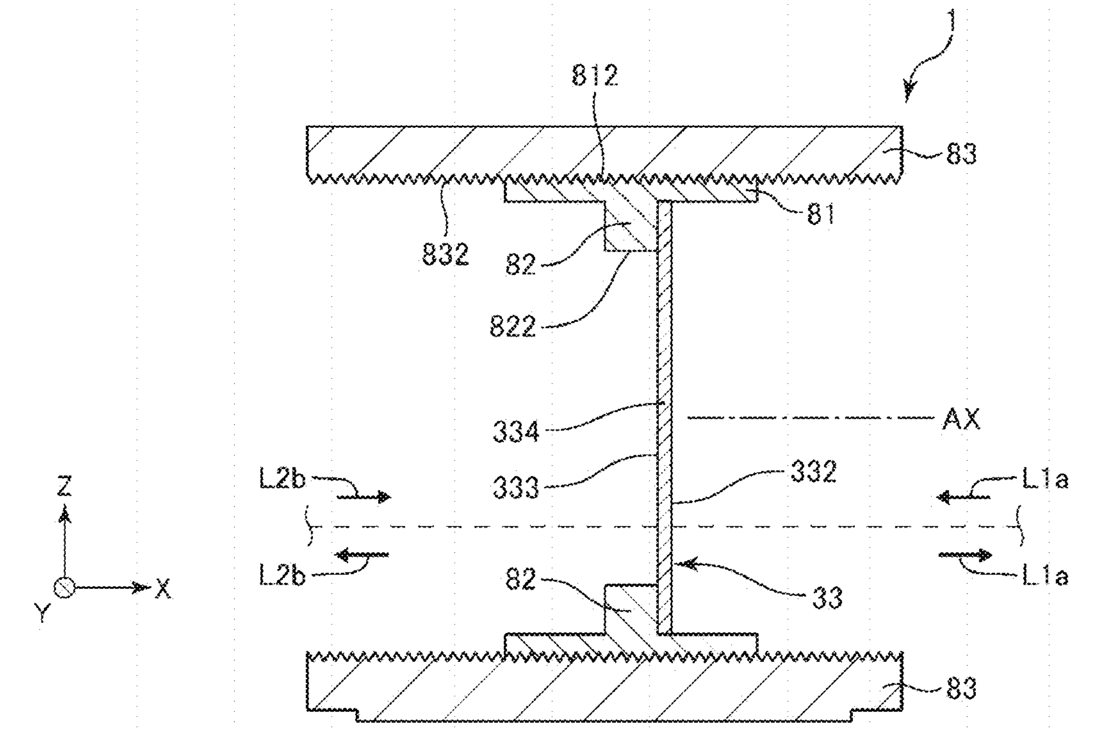
FIG. 11 is a cross-sectional view showing a mirror movement mechanism according to a second modification of the first embodiment.

FIG. 11 is a cross-sectional view showing the mirror movement mechanism 1 according to a second modification of the first embodiment. In FIG. 11, the components same as those in the first embodiment are denoted by the same reference numerals.

The second modification is the same as the first embodiment except that reflecting surfaces 332 and 333 are provided on both surfaces of the substrate 334.

The wall 82 shown in FIG. 11 has a through hole 822 penetrating a portion intersecting the central axis AX. Accordingly, both surfaces of the substrate 334 can be irradiated with light. Therefore, in the substrate 334 shown in FIG. 11, the reflecting surface 332 is provided on one surface, and the reflecting surface 333 is provided on the other surface. According to such a mirror movement mechanism 1, for example, the analysis light L1*a* can be made incident on the reflecting surface 332, and the length measurement light L2*b* can be made incident on the reflecting surface 333. Accordingly, it is possible to eliminate the need for an optical element for diverting the length measurement light L2*b* as shown in FIG. 1, thereby simplifying the configuration of the length measurement optical system 4.

In addition, since the wall 82 has the through hole 822, when an adhesive is applied between the substrate 334 and the wall 82, the excess adhesive can be pushed out towards the through hole 822. Accordingly, a thickness of the adhesive can be made uniform. As a result, arrangement accuracy of the reflecting surfaces 332 and 333 with respect to the wall 82 can be enhanced.

Figure 12:
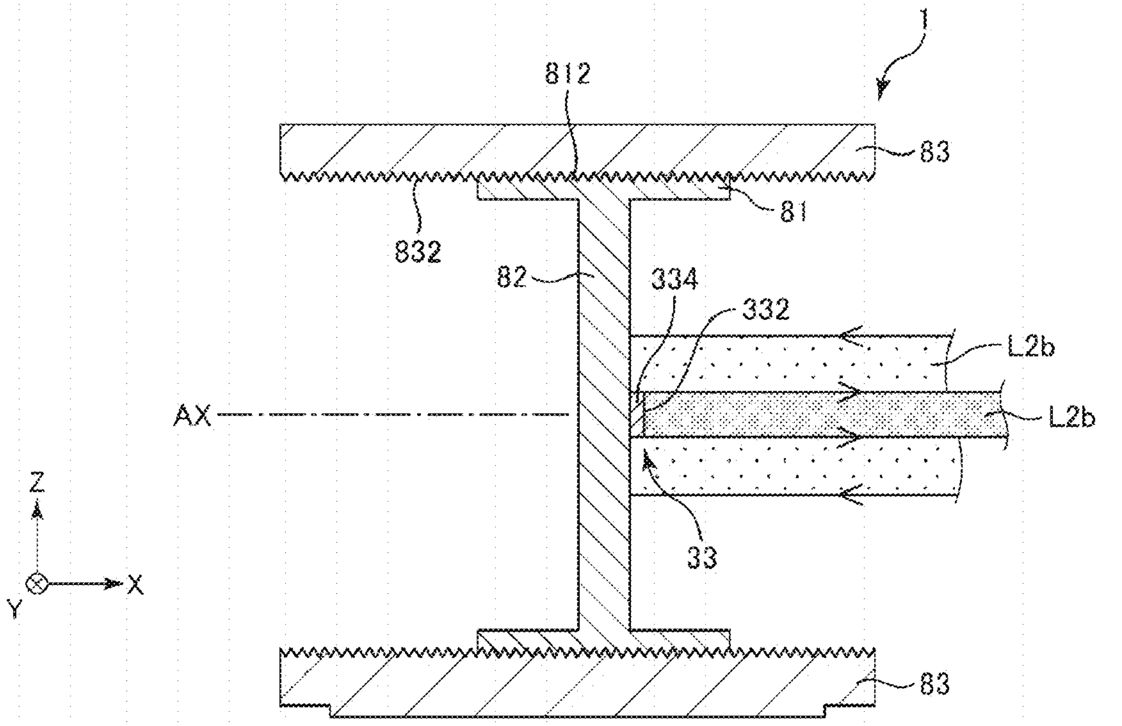
FIG. 12 is a cross-sectional view showing a mirror movement mechanism according to a third modification of the first embodiment.

FIG. 12 is a cross-sectional view showing the mirror movement mechanism 1 according to a third modification of the first embodiment. In FIG. 12, the components same as those in the first embodiment are denoted by the same reference numerals.

The third modification is the same as the first embodiment except that a diameter of the movement mirror 33 is smaller than a luminous flux diameter of the length measurement light L2*b* incident on the reflecting surface 332.

The movement mirror 33 shown in FIG. 12 has the substrate 334. The diameter of the substrate 334 shown in FIG. 12 is set to be smaller than the luminous flux diameter of the length measurement light L2*b* incident on the reflecting surface 332. Accordingly, the length measurement light L2*b* reflected by the reflecting surface 332 has a luminous flux diameter reduced to the diameter of the substrate 334. As a result, the movement mirror 33 shown in FIG. 12 has an iris function of narrowing the luminous flux diameter. Accordingly, it is possible to narrow the luminous flux diameter without providing an iris in a separate location, and thus the number of optical elements constituting the length measurement optical system 4 can be reduced.

Figure 13:
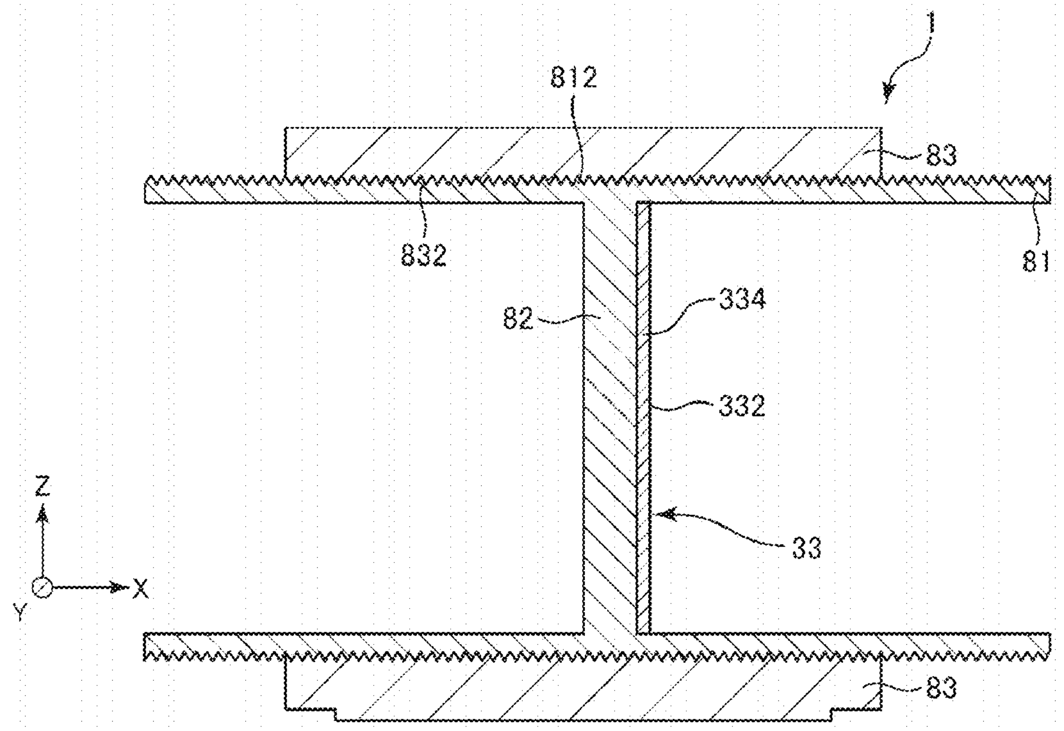
FIG. 13 is a cross-sectional view showing a mirror movement mechanism according to a fourth modification of the first embodiment.

FIG. 13 is a cross-sectional view showing the mirror movement mechanism 1 according to a fourth modification of the first embodiment. In FIG. 13, the components same as those in the first embodiment are denoted by the same reference numerals.

The fourth modification is the same as the first embodiment except that the length of the inner cylinder 81 in the direction of the central axis AX is equal to or longer than the length of the outer cylinder 83.

Both end portions of the inner cylinder 81 shown in FIG. 13 in the direction of the central axis AX protrude from the outer cylinder 83. According to such a configuration, even when dust is generated as a result of the screwing of the first screw groove 812 and the second screw groove 832, the generated dust is less likely to adhere to the reflecting surface 332 of the movement mirror 33.

Figure 14:
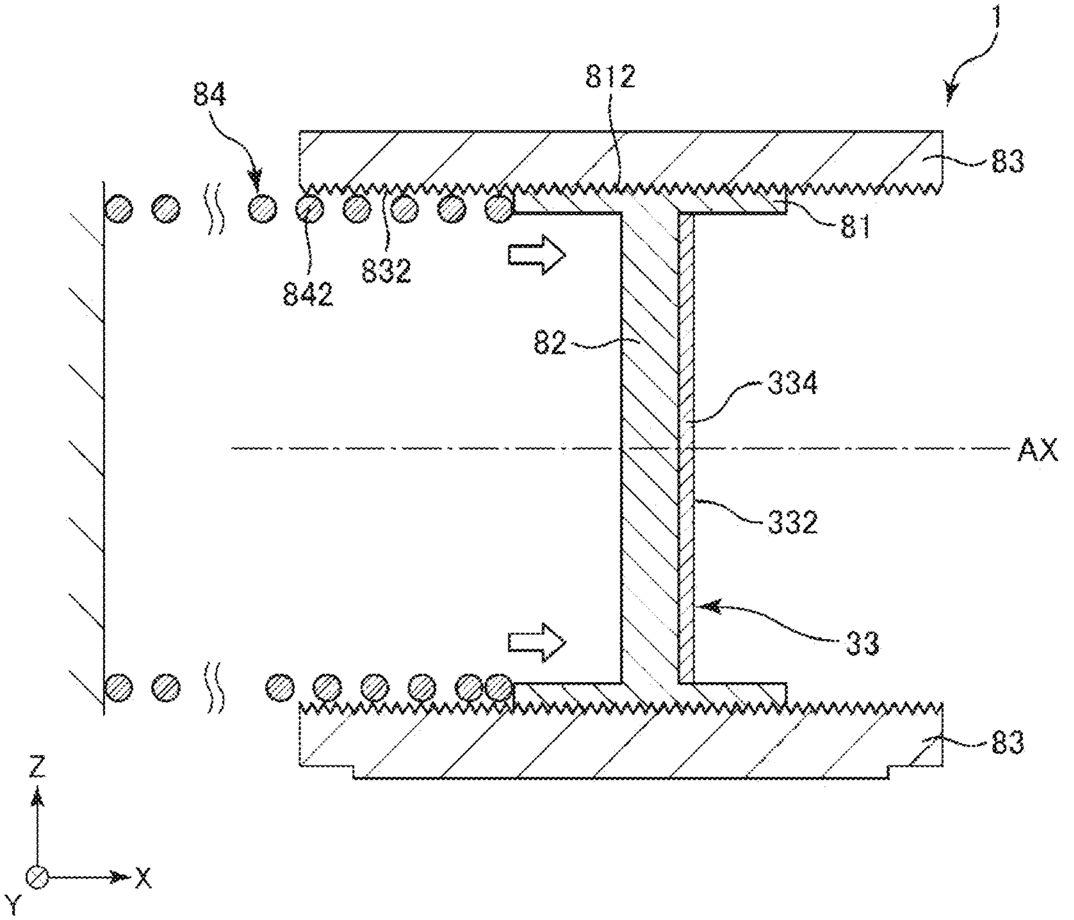
FIG. 14 is a cross-sectional view showing a mirror movement mechanism according to a fifth modification of the first embodiment.
Figure 15:
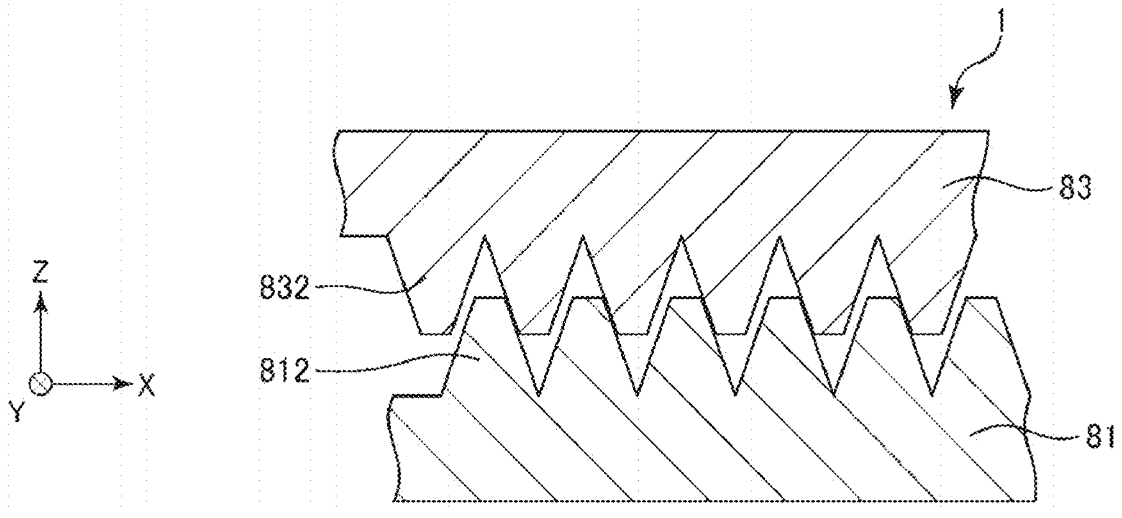
FIG. 15 is a partial enlarged view of the mirror movement mechanism shown in FIG. 14.

FIG. 14 is a cross-sectional view showing the mirror movement mechanism 1 according to a fifth modification of the first embodiment. FIG. 15 is a partial enlarged view of the mirror movement mechanism 1 shown in FIG. 14. In FIGS. 14 and 15, the components same as those in the first embodiment are denoted by the same reference numerals.

The fifth modification is the same as the first embodiment except that a pressurization mechanism 84 having elastic bodies 842 is provided.

The mirror movement mechanism 1 shown in FIG. 14 includes the pressurization mechanism 84 that preloads the inner cylinder 81 in the direction of the central axis AX. The pressurization mechanism 84 shown in FIG. 14 includes the elastic bodies 842. The elastic body 842 generates a repulsive elastic force when compressed in the X-axis direction. The elastic body 842 may be, for example, a coil spring, a leaf spring, rubber, or an elastomer. The elastic body 842 has an end on the X-axis negative side fixed to the outside, and an end on the X-axis positive side being in contact with the inner cylinder 81. Further, the length of the elastic body 842 is set such that the elastic body 842 is held in a state compressed in the X-axis direction more than in its natural state, regardless of the position of the inner cylinder 81. Accordingly, the elastic body 842 preloads the inner cylinder 81 in the direction of the central axis AX. As a result, as shown in FIG. 15, a tooth surface of the first screw groove 812 and a tooth surface of the second screw groove 832 can be maintained in contact with each other. Accordingly, it is possible to prevent the occurrence of backlash caused by a gap between the tooth surfaces, and to prevent the occurrence of the angular shift (deflection angle) of the movement mirror 33.

Figure 16:
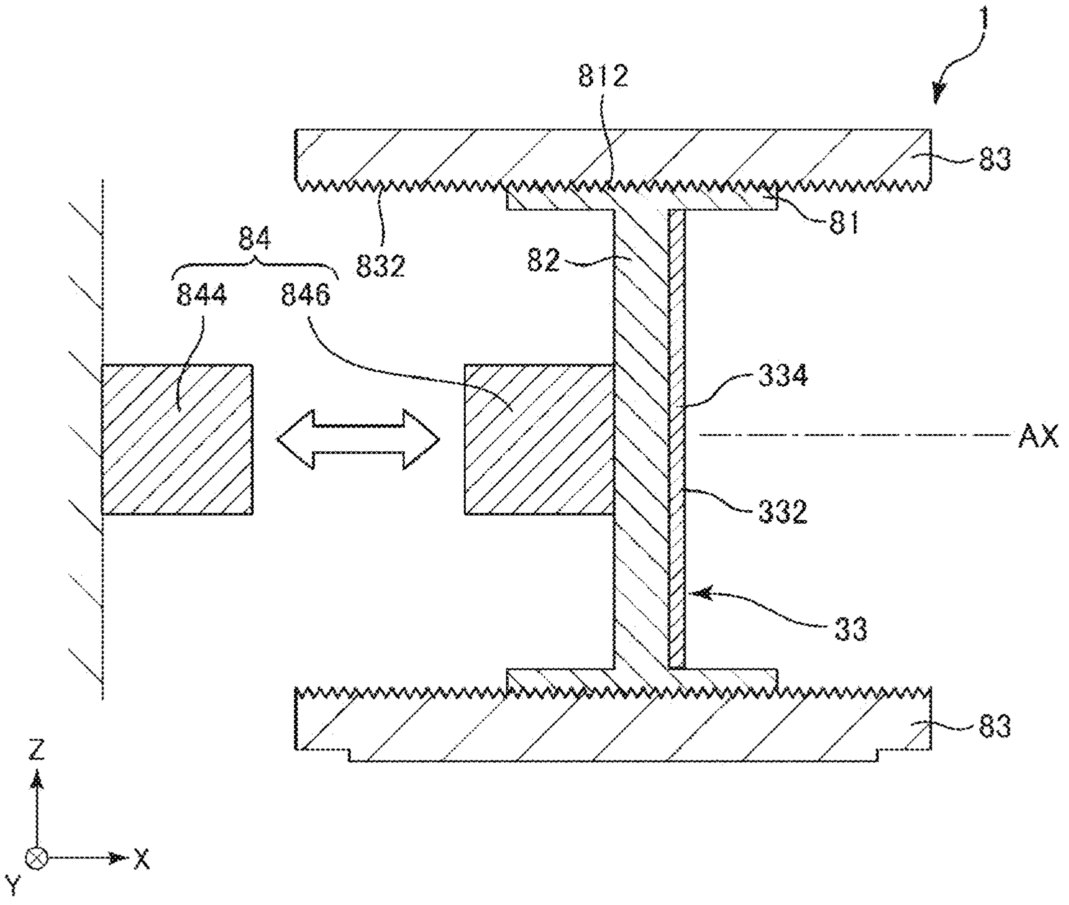
FIG. 16 is a cross-sectional view showing a mirror movement mechanism according to a sixth modification of the first embodiment.

FIG. 16 is a cross-sectional view showing the mirror movement mechanism 1 according to a sixth modification of the first embodiment. In FIG. 16, the components same as those in the first embodiment are denoted by the same reference numerals.

The sixth modification is the same as the first embodiment except that the pressurization mechanism 84 having a magnet 844 and a magnetic body 846 is provided.

The mirror movement mechanism 1 shown in FIG. 16 also includes the pressurization mechanism 84 that preloads the inner cylinder 81 in the direction of the central axis AX. The pressurization mechanism 84 shown in FIG. 16 has the magnet 844 and the magnetic body 846. The magnet 844 is, for example, a permanent magnet or an electromagnetic stone, and is fixed to the outside of the mirror movement 1 mechanism 1. The magnetic body 846 generates a magnetic force such as a magnetic attraction force or a magnetic repulsion force between the magnet 844 and the magnetic body 846. The magnetic body 846 is, for example, a magnetic metal, a metal oxide, or a magnet. As shown in FIG. 15, the magnetic attraction force and the magnetic repulsion force maintain a state in which the tooth surface of the first screw groove 812 and the tooth surface of the second screw groove 832 are in contact with each other. Accordingly, it is possible to prevent the occurrence of backlash caused by the gap between the tooth surfaces.

Figure 17:
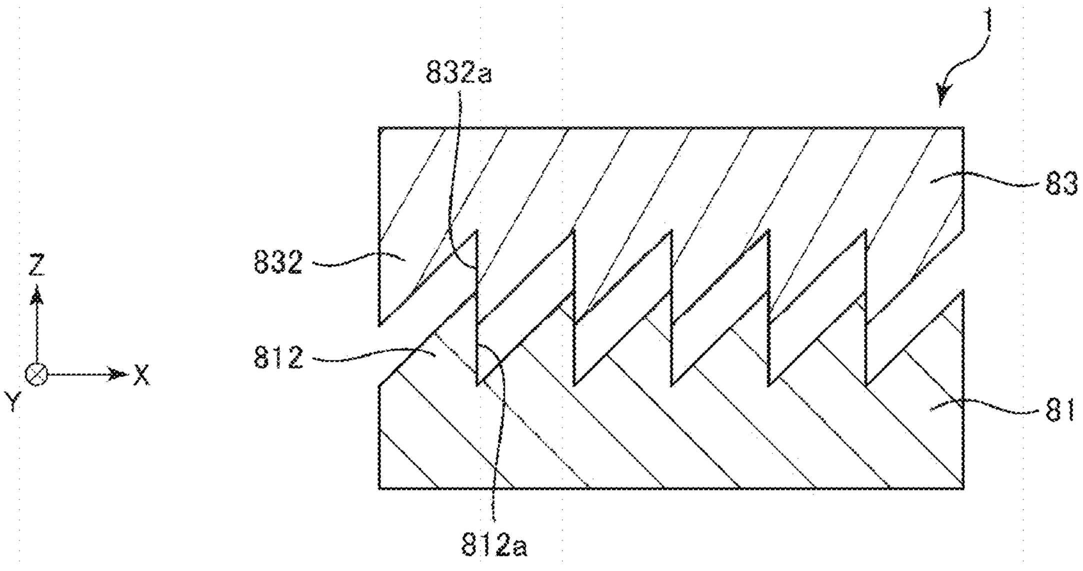
FIG. 17 is a cross-sectional view showing a mirror movement mechanism according to a seventh modification of the first embodiment.
Figure 18:
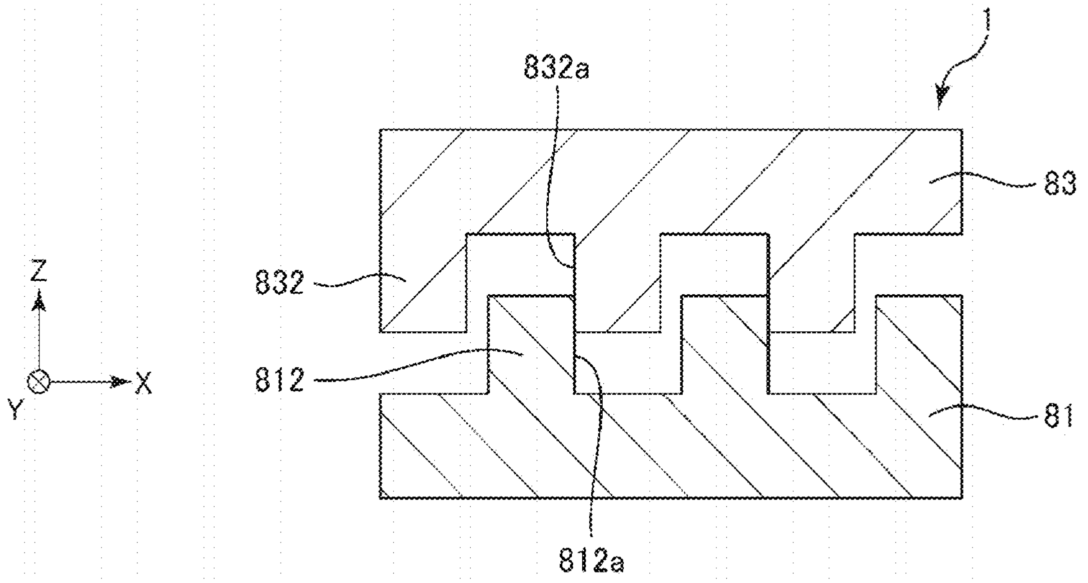
FIG. 18 is a cross-sectional view showing a mirror movement mechanism according to the seventh modification of the first embodiment.

FIGS. 17 and 18 are cross-sectional views showing the mirror movement mechanism 1 according to a seventh modification of the first embodiment. In FIGS. 17 and 18, the components same as those in the first embodiment are denoted by the same reference numerals.

The seventh modification is the same as the first embodiment except that cross-sectional shapes of threads of the first screw groove 812 and the second screw groove 832 are different.

The cross-sectional shape of the thread of the first screw groove 812 and the cross-sectional shape of the thread of the second screw groove 832 shown in FIG. 17 each have a substantially right triangular shape, and a part of the tooth surface (a tooth surface 812*a* of the first screw groove 812 and a tooth surface 832*a* of the second screw groove 832) is set to be substantially orthogonal to the X-axis. The cross-sectional shape of the thread of the first screw groove 812 and the cross-sectional shape of the thread of the second screw groove 832 shown in FIG. 18 each have a substantially rectangular shape, and a part of the tooth surface (the tooth surface 812*a* of the first screw groove 812 and the tooth surface 832*a* of the second screw groove 832) is set to be substantially orthogonal to the X-axis. Further, as shown in FIGS. 17 and 18, the inner cylinder 81 is preloaded so that the state in which the tooth surface 812*a* and the tooth surface 832*a* are in contact with each other is maintained. Accordingly, for example, even when the inner cylinder 81 is shifted in the Z-axis direction with respect to the outer cylinder 83, the shift of the inner cylinder 81 in the X-axis direction can be prevented. As a result, an adverse effect caused by the displacement of the reflecting surface 332 in the X-axis direction can be prevented.

When a plane perpendicular to the central axis

AX is assumed, the angle between the tooth surface 812*a* and the plane, and the angle between the tooth surface 832*a* and the plane are each preferably 15° or less, and more preferably 10° or less. Accordingly, the effect of preventing the inner cylinder 81 from being shifted in the direction of the central axis AX is more reliably obtained. On the other hand, these angles are preferably 1° or more, and more preferably 3° or more. Accordingly, the first screw groove 812 and the second screw groove 832 can be more smoothly screwed together.

Figure 19:
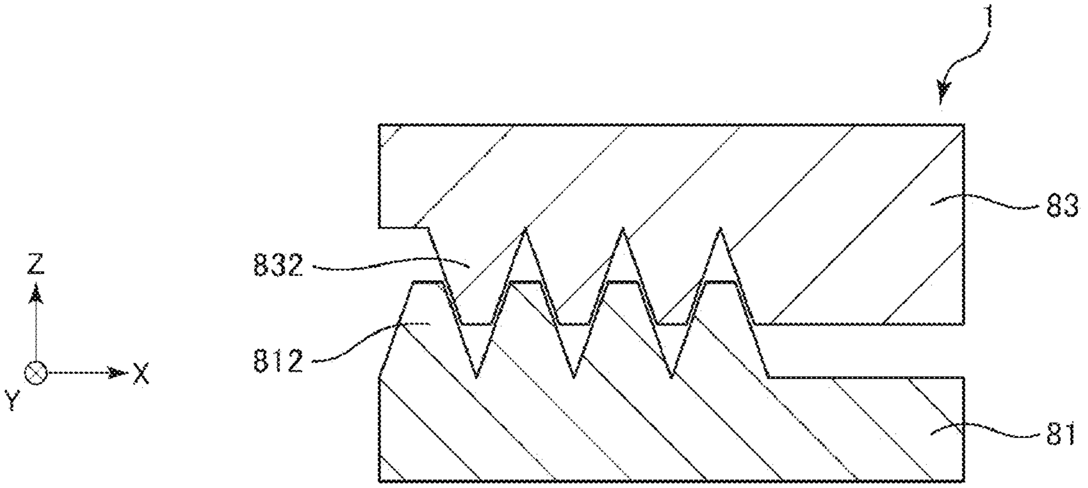
FIG. 19 is a cross-sectional view showing a mirror movement mechanism according to an eighth modification of the first embodiment.

FIG. 19 is a cross-sectional view showing the mirror movement mechanism 1 according to an eighth modification of the first embodiment. In FIG. 19, the components same as those in the first embodiment are denoted by the same reference numerals.

The eighth modification is the same as the first embodiment except that the second screw groove 832 does not reach the end of the outer cylinder 83 on the X-axis positive side, as shown in FIG. 19.

According to such a configuration, the inner cylinder 81 cannot move to an end of the outer cylinder 83 on the X-axis positive side. Therefore, it is possible to prevent the inner cylinder 81 from slipping out from the end of the outer cylinder 83 on the X-axis positive side.

Figure 20:
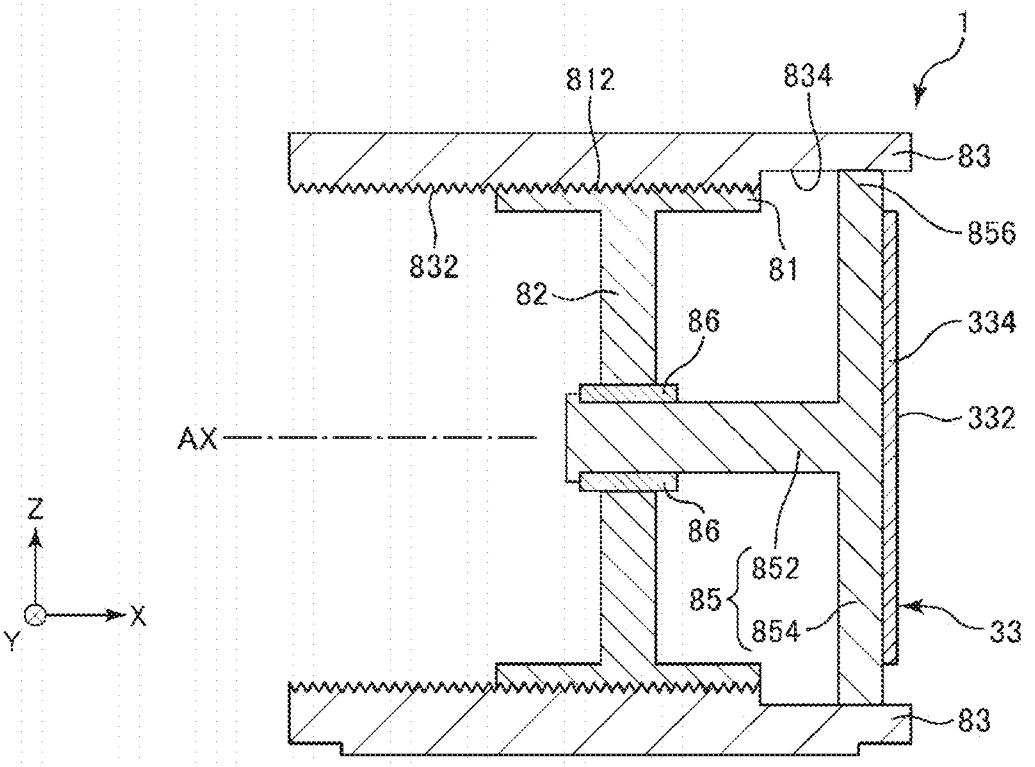
FIG. 20 is a cross-sectional view showing a mirror movement mechanism according to a ninth modification of the first embodiment.
Figure 21:
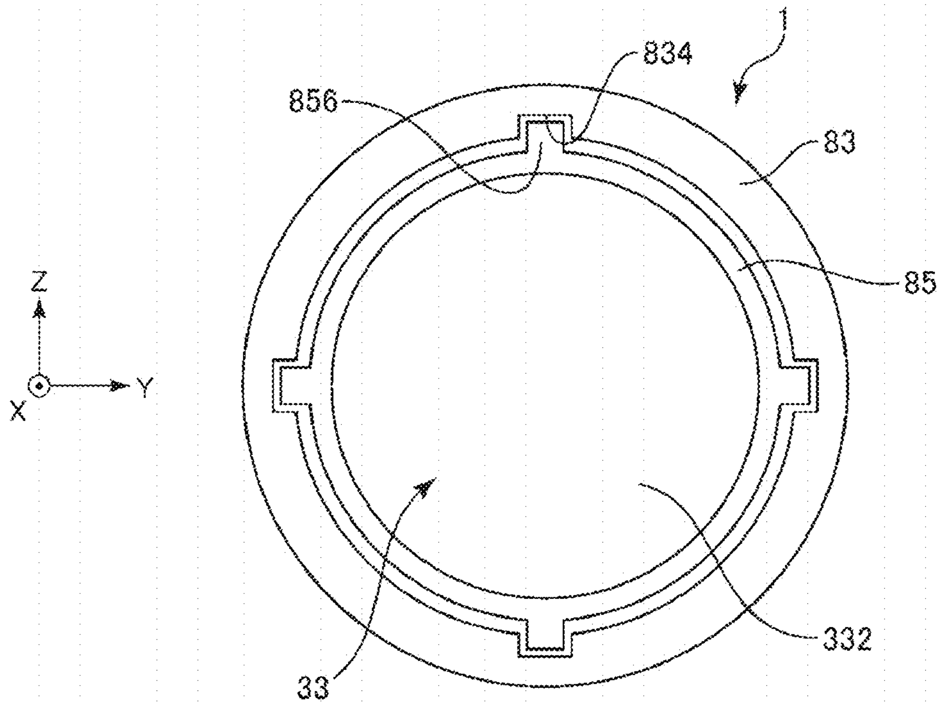
FIG. 21 is a front view of the mirror movement mechanism shown in FIG. 20, as viewed from an X-axis positive side.

FIG. 20 is a cross-sectional view showing the mirror movement mechanism 1 according to a ninth modification of the first embodiment. FIG. 21 is a front view of the mirror movement mechanism 1 shown in FIG. 20, as viewed from the X-axis positive side.

The ninth modification is the same as the first embodiment except that a connector 85 connecting the wall 82 to the movement mirror 33 is provided.

The mirror movement mechanism 1 shown in FIG. 20 includes the connector 85. The connector 85 connects the wall 82 and the movement mirror 33. Specifically, the connector 85 includes a shaft 852 that penetrates through a center portion of the wall 82 and extends along the X-axis, and a disk portion 854 that is connected to the end of the shaft 852 on the X-axis positive side and extends in a Y-Z plane. The end of the shaft 852 on the X-axis negative side is fixed to the wall 82 via a bearing 86. The bearing 86 supports the shaft 852 to be rotatable about the central axis AX. The disk portion 854 supports the movement mirror 33. A part of an outer edge of the disk portion 854 constitutes a protrusion 856 that protrudes outward. On the other hand, a guide groove 834 is provided on an inner surface of the outer cylinder 83 to extend in the X-axis direction and cross the second screw groove 832. Further, as shown in FIG. 21, the protrusion 856 is fitted into the guide groove 834.

According to such a configuration, even when the inner cylinder 81 is rotationally driven, the movement mirror 33 does not rotate. That is, even when the inner cylinder 81 is rotationally driven, power is not transmitted to the connector 85 supported via the bearing 86. Since the protrusion 856 is fitted into the guide groove 834, the connector 85 can be moved in the X-axis direction while preventing rotation of the connector 85 around the central axis AX. Therefore, the movement in the X-axis direction is possible in a state in which the rotation of the movement mirror 33 is prevented, and the analysis light L1*a* and the length measurement light L2*b* are always emitted to the same position of the reflecting surface 332. As a result, it is possible to eliminate defects that may occur with the rotation of the movement mirror 33. Specifically, it is possible to prevent an unintended change in each of reflection intensities of the analysis light L1*a* and the length measurement light L2*b*, which may occur according to the rotation of the movement mirror 33.

In the various modifications described above, effects the same as those of the first embodiment can also be obtained.

3. Second Embodiment

Next, a mirror movement mechanism according to a second embodiment will be described.

Figure 22:
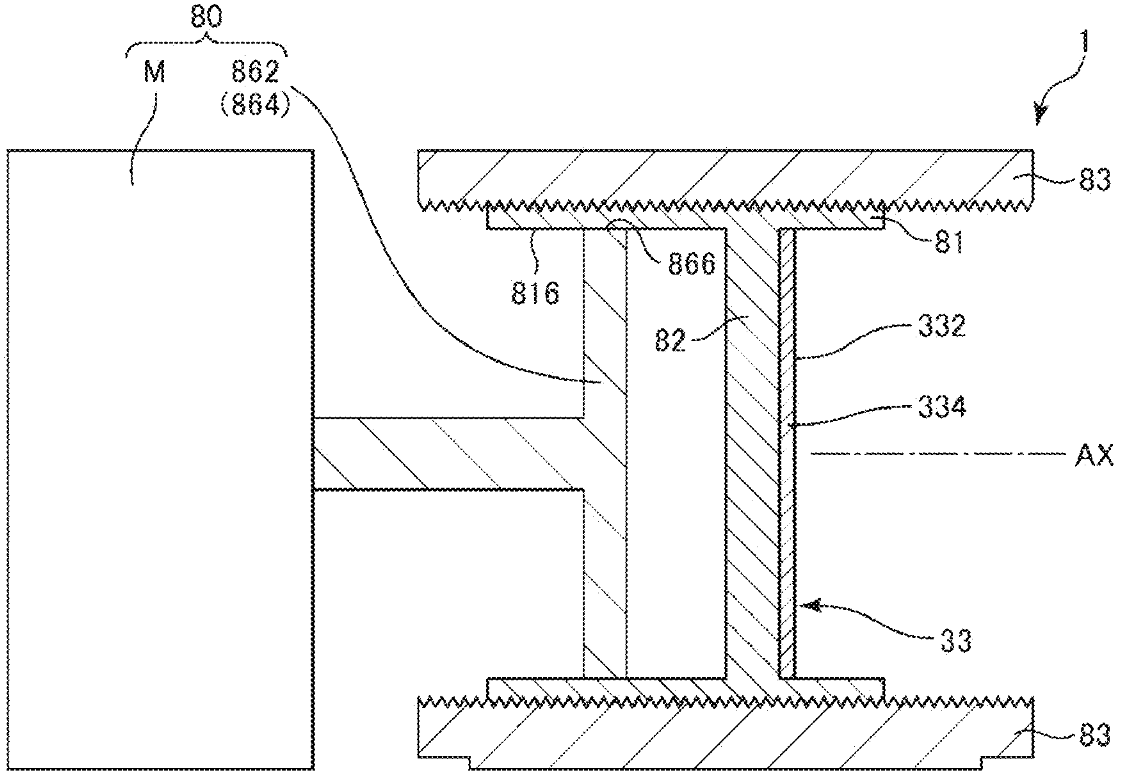
FIG. 22 is a cross-sectional view showing a mirror movement mechanism according to a second embodiment.
Figure 23:
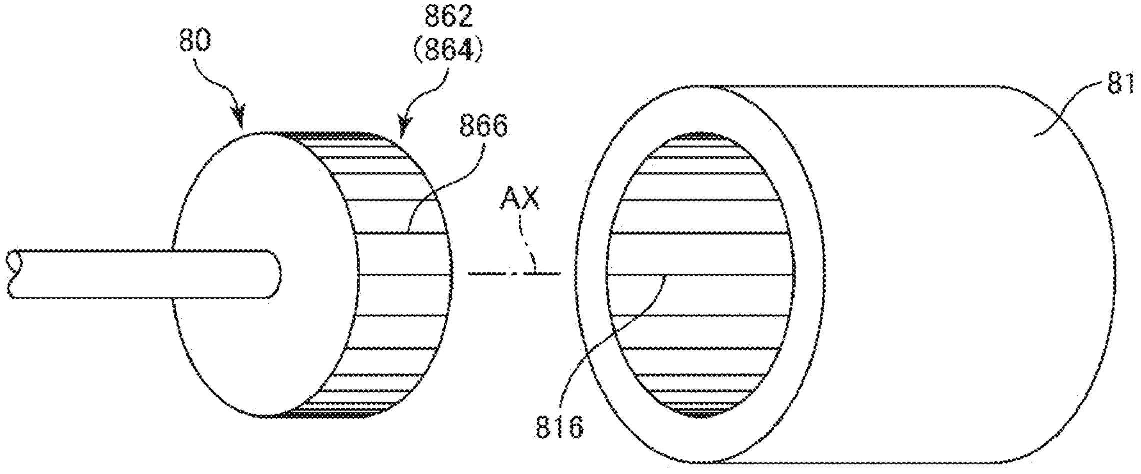
FIG. 23 is a perspective view schematically showing a spline shaft shown in FIG. 22 and a second linear groove provided on an inner surface of an inner cylinder.

FIG. 22 is a cross-sectional view showing the mirror movement mechanism 1 according to the second embodiment. FIG. 23 is a perspective view schematically showing a spline shaft 864 shown in FIG. 22 and second linear grooves 816 provided on an inner surface of the inner cylinder 81.

The second embodiment will be described below, and in the following description, differences from the first embodiment will be primarily described, and description of the same matters will be omitted. In FIGS. 22 and 23, the matters same as those in the first embodiment are denoted by the same reference numerals.

The second embodiment is substantially the same as the first embodiment except for the configuration of the driver 80.

The driver 80 shown in FIG. 22 has the motor M and the power conversion unit 862. The power conversion unit 862 shown in FIG. 22 includes the spline shaft 864 connected to an output shaft of the motor M, and transmits a rotational output of the motor M to the inner cylinder 81. Specifically, as shown in FIG. 23, the second linear grooves 816 extending parallel to the central axis AX are provided on the inner surface of the inner cylinder 81. As shown in FIG. 23, the spline shaft 864 has external teeth 866 on its outer surface. When the external teeth 866 mesh with the second linear grooves 816, the rotational output is transmitted from the spline shaft 864 to the inner cylinder 81. Meanwhile, the second linear grooves 816 extend long in the direction of the central axis AX. Therefore, the spline shaft 864 can slide in the direction of the central axis AX while transmitting the rotational output. Accordingly, the inner cylinder 81 is rotationally driven and can move in the direction of the central axis AX. The spline shaft 864 may be another spline shaft used for a ball spline or the like. Similarly, the inner cylinder 81 having the second linear grooves 816 may be another spline bearing.

As the motor M shown in FIG. 22, a stepping motor is particularly preferably used. Since the stepping motor can easily control a rotation angle even at a low speed, for example, even when a reduction ratio of the power conversion unit 862 is small, an appropriate rotational output can be generated.

In the second embodiment as described above, the effects same as those of the first embodiment can also be obtained.

4. Modification of Second Embodiment

Next, a modification of the second embodiment will be described.

The modification of the second embodiment will be described below, and in the following description, differences from the second embodiment will be primarily described, and description of the same matters will be omitted.

Figure 24:
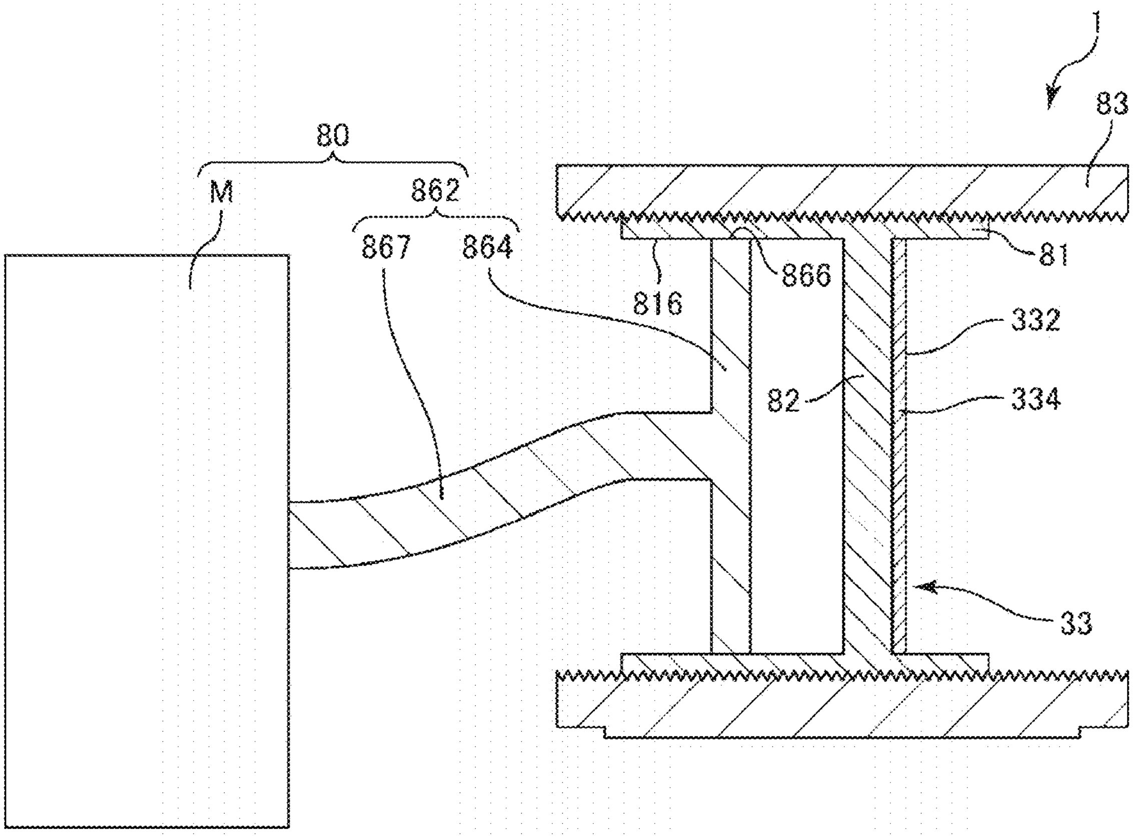
FIG. 24 is a cross-sectional view showing a mirror movement mechanism according to a modification of the second embodiment.

FIG. 24 is a cross-sectional view showing the mirror movement mechanism 1 according to the modification of the second embodiment. In FIG. 24, the components same as those in the second embodiment are denoted by the same reference numerals.

The modification is the same as the second embodiment except that a flexible shaft 867 is used.

The power conversion unit 862 shown in FIG. 24 includes the spline shaft 864 and the flexible shaft 867. The flexible shaft 867 connects the output shaft of the motor M and the spline shaft 864. Since the flexible shaft 867 has flexibility, it is possible to transmit the rotational output even if the flexible shaft does not linearly extend. Therefore, a degree of freedom of the arrangement of the motor M can be enhanced by using the flexible shaft 867. As a result, a reduction in size of the mirror movement mechanism 1 can be achieved, and a degree of freedom in design can be enhanced.

In the various modifications described above, effects the same as those of the second embodiment can also be obtained.

5. Third Embodiment

Next, an interferometer according to a third embodiment will be described.

Figure 25:
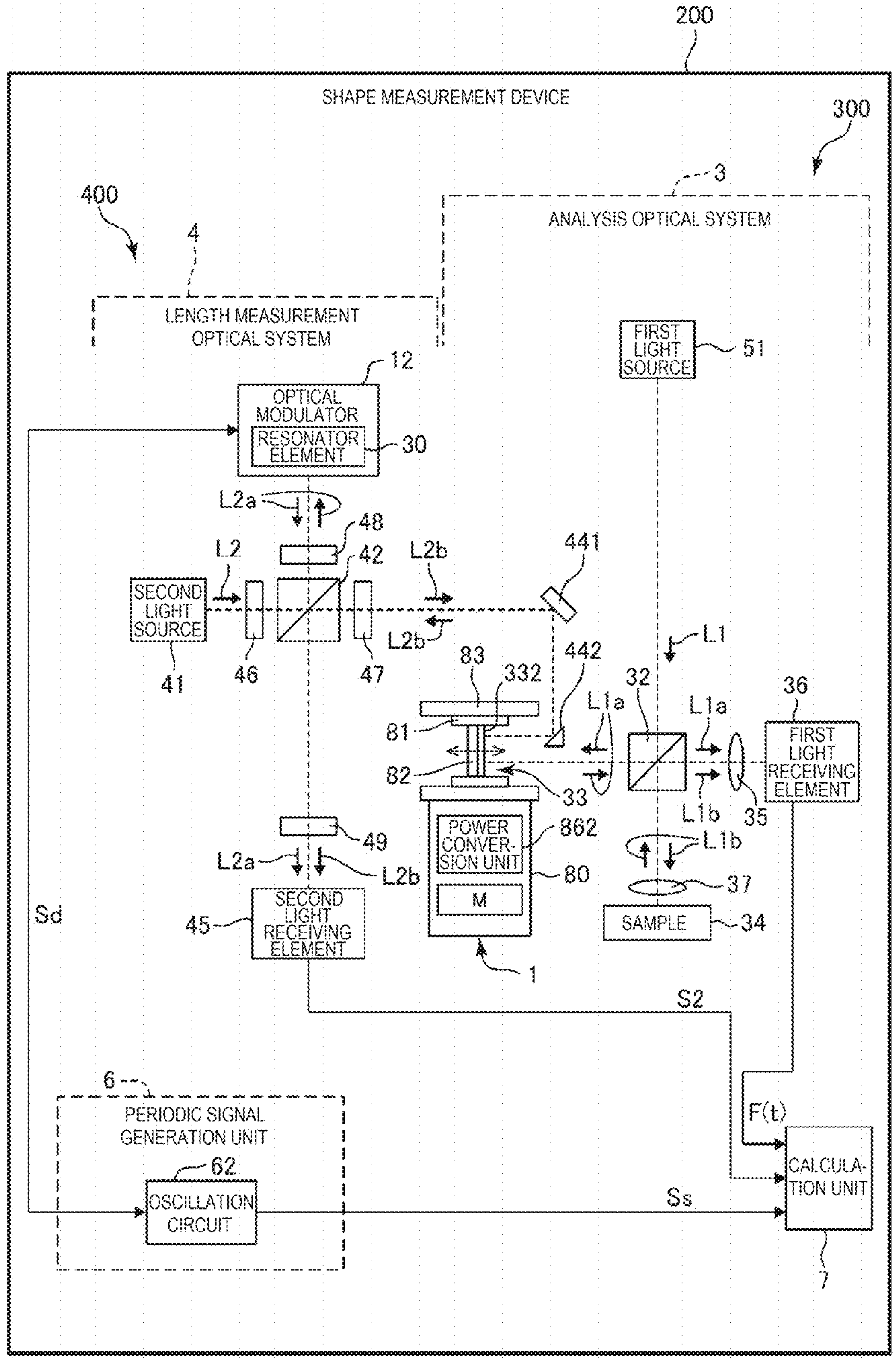
FIG. 25 is a schematic configuration diagram showing a shape measurement device as an interferometer according to a third embodiment.
Figure 26:
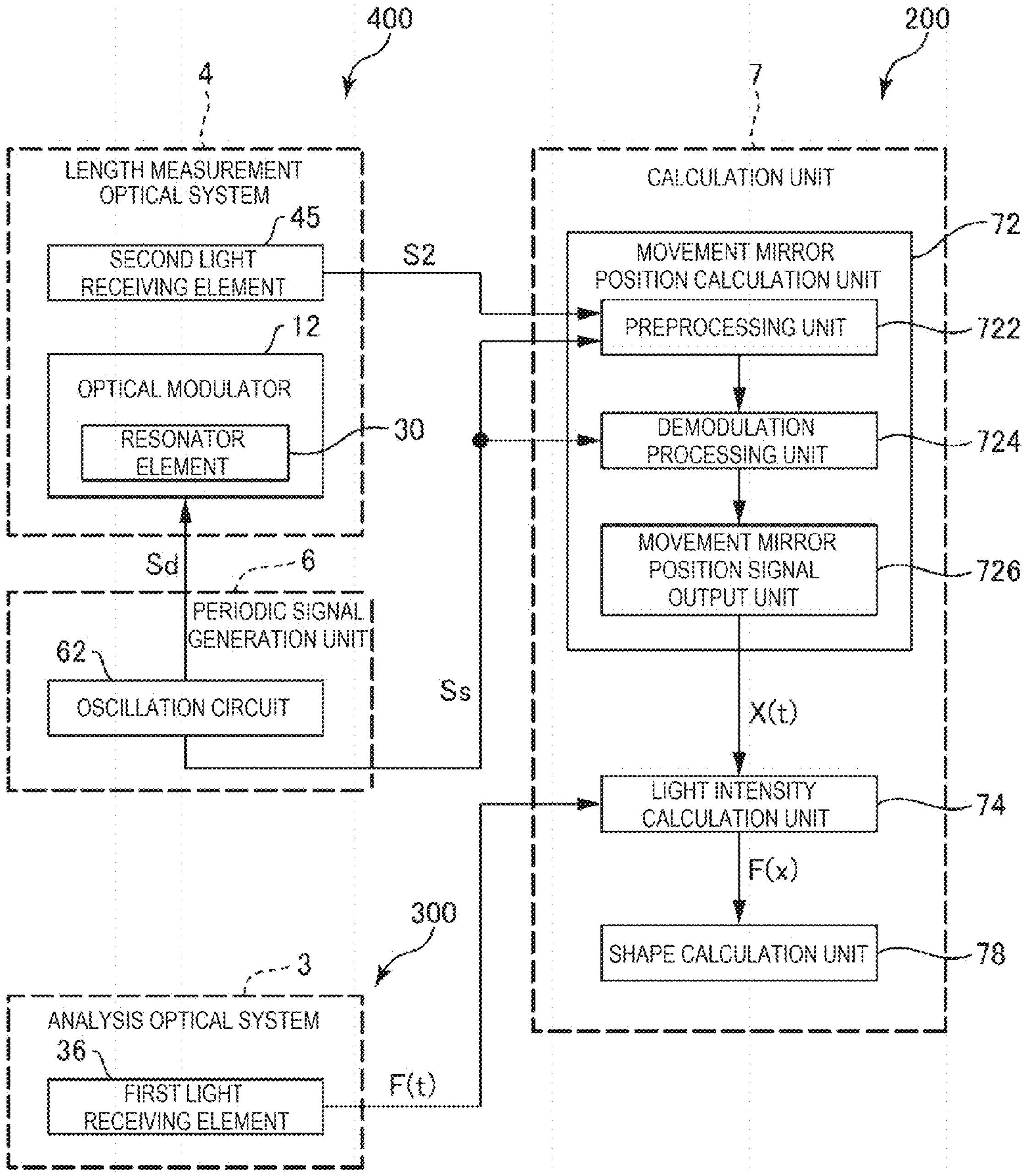
FIG. 26 is a functional block diagram showing main parts of an analysis unit, a length measurement unit, a periodic signal generation unit and a calculation unit shown in FIG. 25.

FIG. 25 is a schematic configuration diagram showing a shape measurement device 200 as the interferometer according to the third embodiment. FIG. 26 is a functional block diagram showing main parts of the analysis unit 300, the length measurement unit 400, the periodic signal generation unit 6 and the calculation unit 7 shown in FIG. 25.

The third embodiment will be described below, and in the following description, differences from the first embodiment will be primarily described, and description of the same matters will be omitted. In FIGS. 25 and 26, items that are the same as those in the first embodiment have the same reference characters.

The spectroscopic device 100 according to the first embodiment is a device that irradiates the sample 9 with the analysis light L1 output from the first light source 51 and performs spectroscopic analysis on the sample 9. Meanwhile, the shape measurement device 200 according to the third embodiment is a device that irradiates the sample 9 with the analysis light L1 and measures a shape of a front surface or inside of the sample 9. The shape measurement device 200 shown in FIG. 25 is the same as the spectroscopic device 100 shown in FIG. 1 except that a configuration of the analysis optical system 3 is different.

The analysis optical system 3 shown in FIG. 25 includes the first light source 51, the beam splitter 32, the condensing lens 35, a condensing lens 37, and the first light receiving element 36.

Examples of the first light source 51 shown in FIG. 25 include a white light source such as a super luminescent diode (SLD) and a light emitting diode (LED); a wavelength swept light source; and various lamps described in the first embodiment. Preferably, a broadband light source called a low-coherence light source is used.

The analysis light L1 emitted from the first light source 51 is split into two parts by the beam splitter 32. The beam splitter 32 shown in FIG. 25 reflects a part of the analysis light L1 toward the movement mirror 33 as the analysis light L1*a* and transmits the other part of the analysis light L1 toward the sample 9 as the analysis light L1*b*. The analysis light L1*b* is condensed by the condensing lens 37 and is emitted to the sample 9.

In addition, the beam splitter 32 transmits the analysis light L1*a* reflected by the movement mirror 33 toward the first light receiving element 36, and reflects the analysis light L1*b* reflected by the sample 9 toward the first light receiving element 36. Therefore, the beam splitter 32 mixes the split analysis light L1*a* and L1*b*, with each other into the interference light.

The first light receiving element 36 receives the interference light and obtains an intensity thereof. A signal indicating a temporal change in the intensity is output as a first light receiving signal F(t). The first light receiving signal F(t) includes the sample-derived component generated by the interaction between the analysis light L1*b* and the sample 9 and the phase information derived from the movement mirror 33 described above. The sample-derived component is, for example, a change in phase added to the analysis light L1*b* according to a surface shape of the sample 9.

Examples of the first light receiving element 36 include a photodiode; a phototransistor; and an image sensor such as a charge coupled device (CCD) and a complementary metal oxide semiconductor (CMOS). By using an image sensor, a two-dimensional distribution of the first light receiving signal F(t) can be obtained. Accordingly, the surface shape of the sample 9 can be two-dimensionally measured.

The length measurement optical system 4, the periodic signal generation unit 6, and the mirror movement mechanism 1 shown in FIG. 25 are the same as those in FIG. 1.

The calculation unit 7 shown in FIG. 26 includes the movement mirror position calculation unit 72, the light intensity calculation unit 74, and a shape calculation unit 78.

Similarly to the first embodiment, the light intensity calculation unit 74 shown in FIG. 26 generates, based on the first light receiving signal F(t) and the movement mirror signal a waveform position X(t), representing the intensity of the first light receiving signal F(t) (interferogram F(x)) at each position of the movement mirror 33. The shape calculation unit 78 shown in FIG. 26 calculates the surface shape and an internal shape of the sample 9 based on the waveform. Specific analysis methods are known under names such as white light interference measurement method and time domain optical coherence tomography (OCT).

Although FIG. 25 shows a case in which the sample 9 reflects the analysis light L1*b*, when the sample 9 transmits the analysis light L1*b*, the shape measurement device 200 shown in FIG. 25 can measure the internal shape (internal structure) of the sample 9. Specific analysis methods are known under names such as optical coherence tomography.

In the third embodiment as described above, the effects same as those of the first embodiment can also be obtained. That is, according to the third embodiment, the effects of the mirror movement mechanism 1 can be obtained, so that the shape measurement device 200 capable of measuring analysis results of the surface shape, the internal shape, and the like of the sample 9 with high accuracy can be implemented.

6. Effects Provided by Embodiments Described Above

The mirror movement mechanism 1 according to each of the above-described embodiments and modifications includes the movement mirror 33, the inner cylinder 81, the outer cylinder 83, and the driver 80. The movement mirror 33 has the reflecting surface 332. The inner cylinder 81 supports the movement mirror 33 on the inner surface of the inner cylinder, and has the first screw groove 812 extending around the central axis AX on the outer surface of the inner cylinder. The outer cylinder 83 has the second screw groove 832 on the inner surface of the outer cylinder which screws into the first screw groove 812. The driver 80 drives and rotates the inner cylinder 81 about the central axis AX as the rotation axis, thereby moving the inner cylinder 81 in the direction of the central axis AX.

According to such a configuration, the first screw groove 812 and the second screw groove 832 are maintained in contact to each other over the entire circumference around the central axis AX or over most of the circumference. Therefore, when the inner cylinder 81 is rotationally driven, the shift of the inner cylinder 81 relative to the outer cylinder 83 can be minimized. As a result, the translational performance of the movement of the movement mirror 33 can be enhanced, and occurrence of an angular shift (deflection angle) of the movement mirror 33 can be prevented. A large movement amount of the movement mirror 33 can be ensured. Furthermore, since it is not necessary to use a large guide mechanism or the like, the mirror movement mechanism 1 can be reduced in size.

The length of the outer cylinder 83 in the direction of the central axis AX is preferably longer than a distance by which the driver 80 moves the inner cylinder 81.

According to such a configuration, the first screw groove 812 and the second screw groove 832 can be screwed together over the entire range of the movement amount of the movement mirror 33. As a result, the occurrence of the deflection angle can be prevented over the entire range of the movement amount of the movement mirror 33.

In addition, it is preferable that the movement mirror 33 is supported at a middle portion of the length of the inner cylinder 81 in the direction of the central axis AX.

According to such a configuration, even when dust is generated as a result of the screwing of the first screw groove 812 and the second screw groove 832, the generated dust is less likely to adhere to the reflecting surface 332 of the movement mirror 33. Accordingly, it is possible to prevent a decrease in the S/N ratio of the interference signal that is caused by a decrease in the reflectance of the reflecting surface 332.

The mirror movement mechanism 1 according to each of the above-described embodiments and modifications may include the wall 82 that is fixed to the inner surface of the inner cylinder 81 and intersects with the central axis AX. Further, the movement mirror 33 may be supported by the wall 82.

According to such a configuration, the wall 82 and the movement mirror 33 can be separately prepared, so that the reflecting surface 332 with high surface accuracy can be obtained.

In addition, the mirror movement mechanism 1 according to each of the above-described embodiments and modifications may include the pressurization mechanism 84 that preloads the inner cylinder 81 in the direction of the central axis AX.

According to such a configuration, a tooth surface of the first screw groove 812 and a tooth surface of the second screw groove 832 can be maintained in contact with each other. Accordingly, it is possible to prevent the occurrence of backlash caused by a gap between the tooth surfaces, and to prevent the occurrence of the angular shift (deflection angle) of the movement mirror 33.

In addition, the pressurization mechanism 84 may be implemented to preload the inner cylinder 81 by an elastic force generated in the elastic body 842.

According to such a configuration, a tooth surface of the first screw groove 812 and a tooth surface of the second screw groove 832 can be maintained in contact with each other by using the elastic force.

The pressurization mechanism 84 may be implemented to preload the inner cylinder 81 by a magnetic force generated by the magnet 844.

According to such a configuration, a tooth surface of the first screw groove 812 and a tooth surface of the second screw groove 832 can be maintained in contact with each other by using the magnetic force.

In addition, it is preferable that an angle between the tooth surface 812*a* of the first screw groove 812 and a plane perpendicular to the central axis AX, and an angle between the tooth surface 832*a* of the second screw groove 832 and the plane are 15° or less.

According to such a configuration, the effect of preventing the inner cylinder 81 from being shifted in the direction of the central axis AX is more reliably obtained.

It is preferable that the movement mirror 33 has retroreflective properties.

According to such a configuration, the light incident on the movement mirror 33 can be returned in the same direction as the incident direction. Accordingly, even when the deflection angle is large, the positions where the reflected analysis light L1*a* and the reflected length measurement light L2*b* return are less likely to change, and thus loss of a light intensity caused by the deflection angle can be minimized.

In addition, the mirror movement mechanism 1 according to each of the above-described embodiments and modifications may include the wall 82 fixed to the inner surface of the inner cylinder 81, the connector 85 connecting the wall 82 to the movement mirror 33, and the bearing 86 that does not rotate the connector 85 when the inner cylinder 81 is rotationally driven.

According to such a configuration, the movement in the X-axis direction is possible in a state in which the rotation of the movement mirror 33 is prevented, and the analysis light L1*a* and the length measurement light L2*b* are always emitted to the same position of the reflecting surface 332. As a result, it is possible to eliminate defects that may occur with the rotation of the movement mirror 33. Specifically, it is possible to prevent an unintended change in each of reflection intensities of the analysis light L1*a* and the length measurement light L2*b*, which may occur according to the rotation of the movement mirror 33.

The movement mirror 33 may have the substrate 334 and the reflecting surfaces 332 and 333 provided on both surfaces of the substrate 334.

According to such a configuration, for example, the analysis light L1*a* can be made incident on the reflecting surface 332, and the length measurement light L2*b* can be made incident on the reflecting surface 333. Accordingly, for example, it is possible to eliminate the need for an optical element for diverting the length measurement light L2*b*, thereby simplifying the configuration of the length measurement optical system 4.

In addition, the inner cylinder 81 may have the first linear groove 814 on the outer surface of the inner cylinder that intersects with the first screw groove 812. Further, the driver 80 may have the motor M and the worm gear 863 connected to the motor M and meshing with the first linear groove 814.

According to such a configuration, a reduction ratio of the power conversion unit 862 can be increased, and a backlash can be reduced to be small. Accordingly, since it is not necessary to add a speed reducer or the like, it is possible to easily reduce the size of the driver 80 and easily enhance positional accuracy of the movement mirror 33.

In addition, it is preferable that the motor M is a DC motor.

According to such a configuration, it can contribute to reducing the size of the mirror movement mechanism 1.

The inner cylinder 81 may have the second linear groove 816 extending parallel to the central axis AX, on the inner surface of the inner cylinder. Further, the driver 80 may have the motor M and the spline shaft 864 connected to the motor M and sliding relative to the inner cylinder 81.

According to such a configuration, the inner cylinder 81 is rotationally driven and can move in the direction of the central axis AX.

The driver 80 may also have the flexible shaft 867 that transmits a rotational output of the motor M to the spline shaft 864.

According to such a configuration, a degree of freedom in arrangement of the motor M can be enhanced. As a result, a reduction in size of the mirror movement mechanism 1 can be achieved, and a degree of freedom in design can be enhanced.

In addition, an interferometer (the spectroscopic device 100 or the shape measurement device 200) according to the embodiment includes the mirror movement mechanism 1 according to the embodiment or each of the modifications, which reflects the analysis light L1*a*, and the analysis optical system 3. The analysis optical system 3 outputs the first light receiving signal F(t) including information derived from the sample 9 by performing interference of light including the analysis light L1*a* reflected by the mirror movement mechanism 1 and the analysis light L1*b* that passes through the sample 9.

According to such a configuration, an interferometer that is reduced in size, weight, and cost can be implemented. The translational performance of the movement of the movement mirror 33 can be enhanced, and occurrence of an angular shift (deflection angle) of the movement mirror 33 can be prevented. Accordingly, when the interferometer is applied to the spectroscopic device 100 or the shape measurement device 200, an analysis result with high accuracy can be obtained.

In addition, the interferometer (the spectroscopic device 100 or the shape measurement device 200) according to the above embodiment may further include the length measurement optical system 4. The length measurement optical system 4 causes the length measurement light L2*b* (laser light) to be incident on the reflecting surface 332, and by performing the interference of light including the reflected length measurement light L2*b*, outputs the second light receiving signal S2 including information indicating the position of the movement mirror 33.

According to such a configuration, the interferogram F(x) having a larger number of data points can be obtained. The large number of data points means a short sampling interval of the interferogram F(x) and high accuracy. Therefore, finally, a spectral pattern with high wavelength resolution (wavenumber resolution) can be obtained. In addition, the interferogram F(x) having a sufficient number of data points can be obtained even when the analysis light L1 having a shorter wavelength (having a larger wavenumber) is used. Accordingly, it is possible to obtain a spectral pattern in a wider wavelength range (wide wavenumber range), that is, a spectral pattern in a wider band.

Although the mirror movement mechanism and the interferometer according to the disclosure have been described above based on the shown embodiments, the mirror movement mechanism and the interferometer according to the disclosure are not limited to the embodiments and modifications, and the configuration of each unit may be replaced with any component or any other component may be added.

The mirror movement mechanism and the interferometer according to the disclosure may be a combination of two or more of the above-described embodiments and modifications. Further, each functional unit provided in the interferometer according to the disclosure may be split into a plurality of elements, or a plurality of functional units may be integrated into one. Although a Michelson interference optical system is used in the above embodiments, other types of interference optical systems may be used.

Further, the arrangement of the sample is not limited to the shown arrangement. Since the sample-derived component is generated by acting the analysis light on the sample, the sample can be disposed at any position as long as the analysis light emitted from the sample is incident on the first light receiving element.

What is claimed is:

1. A mirror movement mechanism comprising:

a movement mirror having a reflecting surface;

an inner cylinder supporting the movement mirror on an inner surface of the inner cylinder and having, on an outer surface of the inner cylinder, a first screw groove extending around a central axis;

an outer cylinder having, on an inner surface of the outer cylinder, a second screw groove screwed into the first screw groove; and a driver configured to move the inner cylinder in a direction of the central axis by rotationally driving the inner cylinder with the central axis as a rotation axis.

2. The mirror movement mechanism according to claim 1, wherein a length of the outer cylinder in the direction of the central axis is longer than a distance by which the driver moves the inner cylinder.

3. The mirror movement mechanism according to claim 1, wherein the movement mirror is supported at a middle portion of a length of the inner cylinder in the direction of the central axis.

4. The mirror movement mechanism according to claim 1, further comprising:

a wall fixed to the inner surface of the inner cylinder and intersecting the central axis, wherein the movement mirror is supported by the wall.

5. The mirror movement mechanism according to claim 1, further comprising:

a pressurization mechanism configured to preload the inner cylinder in the direction of the central axis.

6. The mirror movement mechanism according to claim 5, wherein the pressurization mechanism preloads the inner cylinder by an elastic force generated in an elastic body.

7. The mirror movement mechanism according to claim 5, wherein the pressurization mechanism preloads the inner cylinder by a magnetic force generated by a magnet.

8. The mirror movement mechanism according to claim 5, wherein an angle between a tooth surface of the first screw groove and a plane orthogonal to the central axis and an angle between a tooth surface of the second screw groove and the plane are 15° or less.

9. The mirror movement mechanism according to claim 1, wherein the movement mirror has retroreflective properties.

10. The mirror movement mechanism according to claim 1, further comprising:

a wall fixed to the inner surface of the inner cylinder;

a connector connecting the wall to the movement mirror; and a bearing not rotating the connector when the inner cylinder is rotationally driven.

11. The mirror movement mechanism according to claim 1, wherein the movement mirror includes a substrate, the reflecting surface is provided on a first surface of the substrate, and another reflecting surface is provided on a second surface of the substrate.

12. The mirror movement mechanism according to claim 1, wherein the inner cylinder has, on the outer surface of the inner cylinder, a first linear groove intersecting the first screw groove, and the driver has a motor, and a worm gear connected to the motor and screwed into the first linear groove.

13. The mirror movement mechanism according to claim 12, wherein the motor is a DC motor.

14. The mirror movement mechanism according to claim 1, wherein the inner cylinder has, on the inner surface of the inner cylinder, a second linear groove extending parallel to the central axis, and the driver has a motor, and a spline shaft connected to the motor and sliding with respect to the inner cylinder.

15. The mirror movement mechanism according to claim 14, wherein the driver includes a flexible shaft that transmits a rotational output of the motor to the spline shaft.

16. An interferometer comprising:

the mirror movement mechanism according to claim 1 which reflects analysis light; and an analysis optical system configured to output, by performing interference of light including the analysis light reflected by the mirror movement mechanism and the analysis light passing through a sample, a first light receiving signal including information derived from the sample.

17. The interferometer according to claim 16, further comprising:

a length measurement optical system configured to output, by causing laser light to be incident on the reflecting surface and causing interference of light including the laser light reflected by the reflecting surface, a second light receiving signal including information indicating a position of the movement mirror.

* * * * *